United States Patent [19]
Schmerer et al.

[11] Patent Number: 5,319,544
[45] Date of Patent: Jun. 7, 1994

[54] COMPUTERIZED INVENTORY MONITORING AND VERIFICATION SYSTEM AND METHOD

[75] Inventors: Hal P. Schmerer, St. Louis; Dennis D. Weiand, Ballwin, both of Mo.

[73] Assignee: ITT Corporation, New York, N.Y.

[21] Appl. No.: 439,250

[22] Filed: Nov. 20, 1989

[51] Int. Cl.⁵ ............................................. G06F 15/00
[52] U.S. Cl. .................................................. 364/403
[58] Field of Search ........................ 364/403, 401, 408

[56] References Cited

U.S. PATENT DOCUMENTS

| | | | |
|---|---|---|---|
| 4,636,950 | 1/1987 | Caswell et al. | 364/403 |
| 4,677,552 | 6/1987 | Sibley, Jr. | 364/408 |
| 4,709,137 | 11/1987 | Yoshida | 235/379 |
| 4,783,740 | 11/1988 | Ishizawa et al. | 364/403 |
| 4,853,852 | 8/1989 | Rosen | 364/401 |
| 4,887,208 | 12/1989 | Schneider et al. | 364/403 |
| 4,972,318 | 11/1990 | Brown et al. | 364/403 |
| 4,992,940 | 2/1991 | Dworkin | 364/408 |
| 5,032,989 | 7/1991 | Tornetta | 364/401 |

FOREIGN PATENT DOCUMENTS 54-127249 10/1979 Japan.
WO8904016 5/1989 World Int. Prop. O..

OTHER PUBLICATIONS

Best's Review–Property/Casualty Insurance Edition, vol. 87, No. 1, May 1986, pp. 70–74; S. Kozero: "Laptops: an Auditor's Best Friend".

PC World, vol. 3, No. 4, Apr. 1985, pp. 128–135; M. Sotomayor: "Easy to Relate".

*Primary Examiner*—Roy N. Envall, Jr.
*Assistant Examiner*—Xuong Chunk
*Attorney, Agent, or Firm*—Thomas N. Twomey; Arthur L. Plevy

[57] ABSTRACT

A system and method for monitoring and verifying inventory is provided. The system comprises a portable computer with a printer and modem all "cabled" together and maintained in a carrying case. The portable computer communicates with a mainframe computer on which certain dealer inventory information is maintained. Software, residing on a disk which is accessible by the portable computer, allows for the input of dealer codes which are used to identify inventory information which is downloaded from the mainframe computer to the portable computer. The inventory information is used to support an audit of a dealer's inventory. The system of the present invention provides an auditor with an up-to-date record a dealer's current inventory. The system also provides the auditor with a means for printing out a checklist for use in undertaking the inventory, for preparing reconciliation reports for verifying the auditor's findings with the dealer and input means for inputting the results of the inventory. Ultimately, a final inventory report can be printed which includes the present status of all inventory items and any and all charges collected.

4 Claims, 21 Drawing Sheets

PRINT DATE: 11/16/89  
LAST UPDATE: 10/16/89  
PRINT TIME: 07:48  
BRANCH: 03138083

INSPECTION CHECKLIST  
SEQUENCE: MFG, 0 - 9 SERIAL NO

DEALER NO: 02055  AVERY SALES AND SERVICE  
2572 OLD 27 SOUTH

PAGE 1  
REPORT: F000  
FIN STAT DATE: 12/31/88  
PRIOR F/C: 10/09/89  
BY: ANN MARIE FOX

MFG: YAM PRT

| NOTE DATE | INVOICE NUMBER | IT EM | UNIT ID | PRODUCT | MODEL NO | MATURITY DATE | OLD STATUS | PRESENT BALANCE | PAST DUE AMOUNT | SERIAL NUMBER | COMMENTS |
|---|---|---|---|---|---|---|---|---|---|---|---|
| 08/18/89 | 876103100 | 002 | 275121-7 | SNWMOBLE | XL540P | 03/01/90 | 0821 | 3,853.00 | 0.00 | 057/ 151 | |
| 08/24/89 | 877871000 | 001 | 275237-9 | SNWMOBLE | EX570EP-L | 03/01/90 | 0825 | 4,763.00 | 0.00 | 054/ 231 | |
| 08/10/89 | 876103000 | 006 | 274985-3 | SNWMOBLE | PZ480P | 03/01/90 | 0811 | 3,730.00 | 0.00 | 825/ 1271 | |
| 08/10/89 | 876103000 | 002 | 274984-9 | SNWMOBLE | BR250P | 03/01/90 | 0811 | 1,844.00 | 0.00 | 733/ 532 | |
| 09/28/88 | 811079000 | 003 | 268375-9 | SNWMOBLE | CS340EN | 9/27/90 | 0612 | 2,846.33 | 0.00 | 835/ 1182 | |
| 08/24/89 | 877871000 | 002 | 275238-0 | SNWMOBLE | EX570P | 03/01/90 | 0825 | 4,468.00 | 0.00 | 628/ 253 | |
| 03/17/89 | 850398000 | 001 | 272739-4 | CYCLES | XVZ13DW-L | 03/16/90 | 0320 | 7,790.04 | 0.00 | 769/ 28413 | |
| 08/24/89 | 877871000 | 003 | 275238-1 | SNWMOBLE | SV125EP-W | 03/01/90 | 0825 | 1,805.00 | 0.00 | 243/ 394 | |
| 08/10/89 | 876103000 | 005 | 274985-2 | SNWMOBLE | PZ480EP-B | 03/01/90 | 0811 | 3,894.00 | 0.00 | 185/ 1144 | |
| 08/10/89 | 876103000 | 003 | 274985-0 | SNWMOBLE | CS340EP | 03/01/90 | 0811 | 3,074.00 | 0.00 | 583/ 535 | |
| 03/15/89 | 848439000 | 002 | 272458-3 | CYCLES | XV250W-B | 03/14/90 | 0316 | 1,987.04 | 0.00 | 493/ 21575 | |
| 08/10/89 | 876103000 | 001 | 274984-8 | SNWMOBLE | BR250P | 03/01/90 | 0811 | 1,844.00 | 0.00 | 734/ 526 | |
| 08/10/89 | 876103000 | 007 | 274985-4 | SNWMOBLE | PZ480EP-B | 03/01/90 | 0811 | 3,894.00 | 0.00 | 337/ 1496 | |
| 07/26/89 | 874291000 | 001 | 274801-3 | SNWMOBLE | PZ480P | 03/01/90 | 0727 | 3,730.00 | 0.00 | 087/ 527 | |
| 08/10/89 | 876103000 | 004 | 274985-1 | SNWMOBLE | ET400TRP | 03/01/90 | 0811 | 3,443.00 | 0.00 | 736/ 567 | |
| 09/28/88 | 811079000 | 004 | 268376-0 | SNWMOBLE | CS340N | 09/27/90 | 0612 | 2,651.03 | 0.00 | 175/ 1268 | |
| 08/01/88 | 801560000 | 003 | 267005-7 | SNWMOBLE | SV280M | 07/31/90 | 0612 | 999.53 | 0.00 | 107/ 3888 | |
| 08/18/89 | 876103100 | 001 | 275121-6 | SNWMOBLE | CS340P | 03/01/90 | 0821 | 2,869.00 | 0.00 | 953/ 109 | |
| 08/18/89 | 876103100 | 003 | 275121-8 | SNWMOBLE | SR540P | 03/01/90 | 0821 | 4,017.00 | 0.00 | 261/ 269 | |
| 03/15/89 | 848439000 | 001 | 272458-2 | CYCLES | XV250W-B | 03/14/91 | 0316 | 1,987.04 | 0.00 | 493/ 21569 | |

MFG TOTALS - ITEMS: 20  TOTAL D/S: 65,399.21  TOTAL PAST DUE AMT: 0.00

------------------------------ DEALER TOTALS ------------------------------

CREDIT LINE: 150  
NO ITEMS: 29  
TOTAL D/S: 80,581.35  
TOTAL PAST DUE: 2,702.08

UNPAID INS: 0.00  
UNPAID CHGS 0-30: 0.00  
UNPAID CHGS 30 +: 0.00

ITEMS BY STATUS

| CODE | ITEMS | BALANCE | CODE | ITEMS | BALANCE | CODE | ITEMS | BALANCE |
|---|---|---|---|---|---|---|---|---|

REPRESENTATIVE'S CERTIFICATION

I HAVE PERSONALLY SEEN AND CHECKED THE SERIAL NUMBERS ON THE MERCHANDISE LISTED ABOVE AND CERTIFY THAT THE INFORMATION I HAVE GIVEN IS TRUE AND ACCURATE IN ALL RESPECTS

REPRESENTATIVE SIGNATURE　　DATE　　DEALER SIGNATURE　　DATE

FIG. 4

PRINT DATE: 11/16/89  
LAST UPDATE: 10/16/89  
PRINT TIME: 07:48  
BRANCH: 03138083

PRELIMINARY INVENTORY CHECKLIST  
SEQUENCE: MFG, 0 - 9 SERIAL NO

DEALER NO: 02055  AVERY SALES AND SERVICE  
2572 OLD 27 SOUTH

PAGE 1  
REPORT: F010

FIN STAT DATE: 12/31/88  
PRIOR F/C: 10/09/89  
BY: ANN MARIE FOX

---

MFG: YAM PRT

| NOTE DATE | INVOICE NUMBER | ITEM | UNIT ID | PRODUCT | MODEL NO | MATURITY DATE | OLD STATUS | PRESENT BALANCE | PAST DUE AMOUNT | SERIAL NUMBER | COMMENTS |
|---|---|---|---|---|---|---|---|---|---|---|---|
| 08/18/89 | 876103100 | 002 | 275121-7 | SNWMOBLE | XL540P | 03/01/90 | 0821 | 3,853.00 | 0.00 | 057/ 151 | |
| 08/24/89 | 877871000 | 001 | 275237-9 | SNWMOBLE | EX570EP-L | 03/01/90 | 0825 | 4,763.00 | 0.00 | 054/ 231 | |
| 08/10/89 | 876103000 | 006 | 274985-3 | SNWMOBLE | PZ480P | 03/01/90 | 0811 | 3,730.00 | 0.00 | 825/ 1271 | |
| 08/10/89 | 876103000 | 002 | 274984-9 | SNWMOBLE | BR250P | 03/01/90 | 0811 | 1,844.00 | 0.00 | 733/ 532 | |
| 09/28/88 | 811079000 | 003 | 268375-9 | SNWMOBLE | CS340EN | 9/27/90 | 0612 | 2,846.33 | 0.00 | 835/ 1182 | |
| 08/24/89 | 877871000 | 002 | 275238-0 | SNWMOBLE | EX570P | 03/01/90 | 0825 | 4,468.00 | 0.00 | 628/ 253 | |
| 03/17/89 | 850396000 | 001 | 272739-4 | CYCLES | XVZ13DW-L | 03/16/90 | 0320 | 7,790.04 | 0.00 | 769/ 28413 | |
| 08/24/89 | 877871000 | 003 | 275238-1 | SNWMOBLE | SV125EP-W | 03/01/90 | 0825 | 1,805.00 | 0.00 | 243/ 394 | |
| 08/10/89 | 876103000 | 005 | 274985-2 | SNWMOBLE | PZ480EP-B | 03/01/90 | 0811 | 3,894.00 | 0.00 | 185/ 1144 | |
| 08/10/89 | 876103000 | 003 | 274985-0 | SNWMOBLE | CS340EP | 03/01/90 | 0811 | 3,074.00 | 0.00 | 583/ 535 | |
| 03/15/89 | 848439000 | 002 | 272458-3 | CYCLES | XV250W-B | 03/14/90 | 0316 | 1,987.04 | 0.00 | 493/ 21575 | |
| 08/10/89 | 876103000 | 001 | 274984-8 | SNWMOBLE | BR250P | 03/01/90 | 0811 | 1,844.00 | 0.00 | 734/ 526 | |
| 08/10/89 | 876103000 | 007 | 274985-4 | SNWMOBLE | PZ480EP-B | 03/01/90 | 0811 | 3,894.00 | 0.00 | 337/ 1496 | |
| 07/26/89 | 874291000 | 001 | 274801-3 | SNWMOBLE | PZ480P | 03/01/90 | 0727 | 3,730.00 | 0.00 | 067/ 527 | |
| 08/10/89 | 876103000 | 004 | 274985-1 | SNWMOBLE | ET400TRP | 03/01/90 | 0811 | 3,443.00 | 0.00 | 736/ 567 | |
| 09/28/88 | 811079000 | 004 | 268376-0 | SNWMOBLE | CS340N | 09/27/90 | 0612 | 2,651.03 | 0.00 | 175/ 1268 | |
| 06/01/88 | 801560000 | 003 | 267005-7 | SNWMOBLE | SV280M | 07/31/90 | 0612 | 999.53 | 0.00 | 107/ 3888 | |
| 08/18/89 | 876103100 | 001 | 275121-6 | SNWMOBLE | CS340P | 03/01/90 | 0821 | 2,869.00 | 0.00 | 953/ 109 | |
| 08/18/89 | 876103100 | 003 | 275121-8 | SNWMOBLE | SR540P | 03/01/90 | 0821 | 4,017.00 | 0.00 | 261/ 269 | |
| 03/15/89 | 848439000 | 001 | 272458-2 | CYCLES | XV250W-B | 03/14/91 | 0316 | 1,987.04 | 0.00 | 493/ 21569 | |

MFG TOTALS - ITEMS: 20  TOTAL D/S: 65,399.21  TOTAL PAST DUE AMT: 0.00

---

MFG: YAMAHA

| NOTE DATE | INVOICE NUMBER | ITEM | UNIT ID | PRODUCT | MODEL NO | MATURITY DATE | OLD STATUS | PRESENT BALANCE | PAST DUE AMOUNT | SERIAL NUMBER | COMMENTS |
|---|---|---|---|---|---|---|---|---|---|---|---|
| 01/01/89 | F727784000 | 002 | 275121-7 | SNWMOBLE | CF300M | 12/26/89 | 0110 | 2,300.00 | 0.00 | 710/ 572 | |
| 12/15/88 | F752804000 | 001 | 275227-0 | MOTO-4 | YFM200DX | 12/09/89 | 0114 | 1,763.00 | 0.00 | 465/ 2972 | |
| 12/15/88 | F752... | | | | | 12/... | | | 0.00 | ... 152 | |
| 01/01/89 | F | | | | | | | | | | |
| 10/27/89 | | | | | | | | | | | |
| 4/15/... | | | | | | | | | | | |

---

- - - DEALER TOTALS - - -

CREDIT LINE: 150  
NO ITEMS: 29  
TOTAL D/S: 80,581.35  
TOTAL PAST DUE: 2,702.08

UNPAID INS: 0.00  
UNPAID CHGS 0-30: 0.00  
UNPAID CHGS 30 +: 0.00

ITEMS BY STATUS

| CODE | ITEMS | BALANCE | CODE | ITEMS | BALANCE | CODE | ITEMS | BALANCE |
|---|---|---|---|---|---|---|---|---|

FIG. 5

PRINT DATE: 11/16/89
LAST UPDATE: 10/16/89
PRINT TIME: 07:56

INVENTORY COUNT SHEET

PAGE 1
REPORT: F020

BRANCH: 03138083

DEALER NO: 02055
AVERYS SALES AND SERVICE
2572 OLD 27 SOUTH

MFG: YAM PRT

| 0 | 1 | 2 | 3 | 4 | 5 | 6 | 7 | 8 | 9 |
|---|---|---|---|---|---|---|---|---|---|
|   | 151<br>XL540P | 532<br>BR250P | 253<br>EX570P | 394<br>SV125EP | 535<br>CS340EP | 526<br>BR250P | 527<br>PZ480P | 1268<br>CS340N | 109<br>CS340P |
|   | 231<br>EX570EP | 1182<br>CS340EN | 8413<br>XVZ13DW | 1144<br>PZ480EP | 1575<br>XV250W- | 1496<br>PZ480EP | 567<br>ET400TR | 3888<br>SV80M | 269<br>SR540P |
|   | 1271<br>PZ480P |   |   |   |   |   |   |   | 1569<br>XV350W- |

MFG: YAMAHA

| 0 | 1 | 2 | 3 | 4 | 5 | 6 | 7 | 8 | 9 |
|---|---|---|---|---|---|---|---|---|---|
|   |   | 572<br>CF300M | 703<br>CF300M |   |   |   | 2007<br>YFM100U | 318<br>CF300M | 3649<br>YFM80U- |
|   |   | 2972<br>YFM200D |   |   |   |   | 3727<br>TW200T- | 3728<br>TW200T- |   |
|   |   | 3452<br>YFM200D |   |   |   |   |   |   |   |

COMMENTS:

FIG. 6

PRINT DATE: 11/16/89
LAST UPDATE: 10/16/89
PRINT TIME: 07:57

MODEL NO. COUNT SHEET

PAGE 1
REPORT: F080

BRANCH: 03138083        DEALER NO: 02055
AVERYS SALES AND SERVICE
2572 OLD 27 SOUTH

MFG: YAM PRT

| MODEL NR | PRODUCT | QTY | BALANCE | COUNT/COMMENTS |
|---|---|---|---|---|
| BR250P | SNWMOBLE | 2 | 3,688.00 | |
| CS340EN | SNWMOBLE | 1 | 2,846.53 | |
| CS340EP | SNWMOBLE | 1 | 3,074.00 | |
| CS340N | SNWMOBLE | 1 | 2,651.03 | |
| CS340P | SNWMOBLE | 1 | 2,869.00 | |
| ET400TRP | SNWMOBLE | 1 | 3,443.00 | |
| EX570EP-L | SNWMOBLE | 1 | 4,673.00 | |
| EX570P | SNWMOBLE | 1 | 4,468.00 | |
| PZ480EP-B | SNWMOBLE | 2 | 7,788.00 | |

MFG: YAMAHA

| MODEL NR | PRODUCT | QTY | BALANCE | COUNT/COMMENTS |
|---|---|---|---|---|
| YFM100U-W | MOTO-4 | 1 | 1,135.00 | |
| YFM200DXU- | MOTO-4 | 2 | 3,550.00 | |
| YFM80U-R | MOTO-4 | 1 | 895.00 | |

TOTAL ITEMS: 29
TOTAL BALANCE: 80,581.35

COMMENTS:

FIG. 7

| | | | | | | | |
|---|---|---|---|---|---|---|---|
| PRINT DATE: | 11/16/89 | | | | | PAGE | 1 |
| LAST UPDATE: | 10/16/89 | REMITTANCE ADVICE | | | | REPORT: F050 | |
| PRINT TIME: | 8:07 | SEQUENCE: MFG, 0 - 9 SERIAL NO | | | | | |

BRANCH: 03138083        DEALER NO: 02055    AVERYS SALES AND SERVICE
                                            2572 OLD 27 SOUTH

| INVOICE NO. | ITEM | UNIT ID | AMOUNT COLLECTED | STATUS | MFG | MODEL NO | SERIAL NO |
|---|---|---|---|---|---|---|---|
| F727784000 | 002 | 271050-8 | 2,300.02 | SAU | YAMAHA | CF300M | 710/ 572 |
| F690782000 | 001 | 364938-8 | 135.10 | DEM | YAMAHA | TW200T-B | 861/ 3727 |
| F752804000 | 005 | 270403-0 | 895.00 | SAU | YAMAHA | YFM80U-R | 432/ 53649 |

ITEM TOTAL:   3,330.12
CHARGES:          0.00
INSURANCE:        0.00
                --------
SUB TOTAL:    3,330.12

ADJUSTMENTS: _____    DESCRIP: _____
FINAL TOTAL: _____

FIG. 8

PRINT DATE: 11/16/89  
LAST UPDATE: 10/16/89  
PRINT TIME: 08:08  
BRANCH: 03138083

PRELIMINARY INVENTORY CHECKLIST  
SEQUENCE: MFG, 0 - 9 SERIAL NO

DEALER NO: 02055  AVERY SALES AND SERVICE  
2572 OLD 27 SOUTH

PRIOR F/C BY:  ANN MARIE FOX  
CURRENT F/C BY:  BRIAN D. LINTON

PAGE 1  
REPORT: F060  
FIN STAT DATE: 12/31/88  
PRIOR F/C: 10/09/89

---

MFG: YAM PRT

| NOTE DATE | INVOICE NUMBER | UNIT ID | PRODUCT | MODEL NO | MATURITY DATE | OLD STATUS | ORIGINAL AMOUNT | PRESENT BALANCE | PAST DUE AMOUNT | SERIAL NUMBER | NEW STATUS | AMOUNT COLLECTED |
|---|---|---|---|---|---|---|---|---|---|---|---|---|
| 08/18/89 | 876103100 | 275121-7 | SNWMOBLE | XL540P | 03/01/90 | 0821 | 3,853.00 | 3,853.00 | 0.00 | 057/ 151 | ✓ | 0.00 |
| 08/24/89 | 877871000 | 275237-9 | SNWMOBLE | EX570EP-L | 03/01/90 | 0825 | 4,763.00 | 4,763.00 | 0.00 | 054/ 231 | CV | 0.00 |
| 08/10/89 | 876103000 | 274985-3 | SNWMOBLE | PZ480P | 03/01/90 | 0811 | 3,730.00 | 3,730.00 | 0.00 | 825/ 1271 | ✓ | 0.00 |
| 08/10/89 | 876103000 | 274984-9 | SNWMOBLE | BR250P | 03/01/90 | 0811 | 1,844.00 | 1,844.00 | 0.00 | 733/ 532 | C | 0.00 |
| 09/28/88 | 811079000 | 268375-9 | SNWMOBLE | CS340EN | 9/27/90 | 0612 | 2,956.00 | 2,846.33 | 0.00 | 835/ 1182 | * | 0.00 |
| 08/24/89 | 877871000 | 275238-0 | SNWMOBLE | EX570P | 03/01/90 | 0825 | 4,468.00 | 4,468.00 | 0.00 | 628/ 253 | ✓ | 0.00 |
| 03/17/89 | 850396000 | 272739-4 | CYCLES | XVZ13DW-L | 03/16/90 | 0320 | 8,064.00 | 7,790.04 | 0.00 | 769/ 28413 | ✓ | 0.00 |
| 08/24/89 | 877871000 | 275238-1 | SNWMOBLE | SV125EP-W | 03/01/90 | 0825 | 1,805.00 | 1,805.00 | 0.00 | 243/ 394 | S01 | 0.00 |
| 08/10/89 | 876103000 | 274985-2 | SNWMOBLE | PZ480EP-B | 03/01/90 | 0811 | 3,894.00 | 3,894.00 | 0.00 | 185/ 1144 | ✓ | 0.00 |
| 08/10/89 | 876103000 | 274985-0 | SNWMOBLE | CS340EP | 03/01/90 | 0811 | 3,074.00 | 3,074.00 | 0.00 | 583/ 535 | ✓ | 0.00 |
| 03/15/89 | 848439000 | 272458-3 | CYCLES | XV250W-B | 03/14/90 | 0316 | 2,062.00 | 1,987.04 | 0.00 | 493/ 21575 | DIS | 0.00 |
| 08/10/89 | 876103000 | 274984-8 | SNWMOBLE | BR250P | 03/01/90 | 0811 | 1,844.00 | 1,844.00 | 0.00 | 734/ 526 | C | 0.00 |
| 08/10/89 | 876103000 | 274985-4 | SNWMOBLE | PZ480EP-B | 03/01/90 | 0811 | 3,894.00 | 3,894.00 | 0.00 | 337/ 1496 | C | 0.00 |
| 07/26/89 | 874291000 | 274801-3 | SNWMOBLE | PZ480P | 03/01/90 | 0727 | 3,730.00 | 3,730.00 | 0.00 | 087/ 527 | INS | 0.00 |
| 08/10/89 | 876103000 | 274985-1 | SNWMOBLE | ET400TRP | 03/01/90 | 0811 | 3,443.00 | 3,443.00 | 0.00 | 736/ 567 | ✓ | 0.00 |
| 09/28/88 | 811079000 | 268376-0 | SNWMOBLE | CS340N | 09/27/90 | 0612 | 2,753.00 | 2,651.03 | 0.00 | 175/ 1268 | ✓ | 0.00 |
| 08/01/88 | 801560000 | 267005-7 | SNWMOBLE | SV280M | 07/31/90 | 0612 | 1,037.00 | 999.53 | 0.00 | 107/ 3888 | RTD | 0.00 |
| 08/18/89 | 876103100 | 275121-6 | SNWMOBLE | CS340P | 03/01/90 | 0821 | 2,869.00 | 2,869.00 | 0.00 | 953/ 109 | ✓ | 0.00 |
| 08/18/89 | 876103100 | 275121-8 | SNWMOBLE | SR540P | 03/01/90 | 0821 | 4,017.00 | 4,017.00 | 0.00 | 261/ 269 | ✓ | 0.00 |
| 03/15/89 | 848439000 | 272458-2 | CYCLES | XV250W-B | 03/14/91 | 0316 | 2,062.00 | 1,987.04 | 0.00 | 493/ 21569 | PD | 0.00 |

MFG TOTALS - ITEMS: 20   TOTAL D/S: 65,399.21   TOTAL PAST DUE AMT: 0.00

---

MFG: YAMAHA

| NOTE DATE | INVOICE NUMBER | UNIT ID | PRODUCT | MODEL NO | MATURITY DATE | OLD STATUS | ORIGINAL AMOUNT | PRESENT BALANCE | PAST DUE AMOUNT | SERIAL NUMBER | NEW STATUS | AMOUNT COLLECTED |
|---|---|---|---|---|---|---|---|---|---|---|---|---|
| 12/15/88 | F752804000 | 270402-6 | MOTO-4 | YFM200DXU- | 12/09/89 | 1214 | 1,775.00 | 1,775.00 | 0.00 | 465/ 2972 | ✓ | 0.00 |
| 12/15/88 | F752804000 | 270402-7 | MOTO-4 | YFM200DXU- | 12/09/89 | 1214 | 1,775.00 | 1,775.00 | 0.00 | 020/ 3452 | FIX | 0.00 |
| 01/01/89 | F727784000 | 271050-9 | SNWMOBLE | CF300M | 12/26/89 | 0612 | 2,300.02 | 2,300.02 | 0.00 | 854/ 703 | ✓ | 0.00 |
| 10/27/88 | F739093000 | 269199-9 | MOTO-4 | YFM100U-W | 10/21/89 | 1026 | 1,135.00 | 1,135.00 | 0.00 | 059/ 52007 | ✓ | 0.00 |
| 4/15/88 | F690782000 | 264938-8 | CYCLES | TW200T-B | 04/09/89 | 0415 | 1,351.04 | 1,215.94 | 1,215.94 | 861/ 3727 | DEM | 135.10 |
| 01/01/89 | F727784000 | 271050-7 | SNWMOBLE | CF300M | 12/26/89 | 0612 | 2,300.02 | 2,300.02 | 0.00 | 849/ 318 | ✓ | 0.00 |
| 4/15/88 | F690782000 | 264938-9 | CYCLES | TW200T-B | 04/09/89 | 0415 | 1,351.04 | 1,351.04 | 1,351.04 | 861/ 3728 | ✓ | 0.00 |

MFG TOTALS - ITEMS: 20   TOTAL D/S: 11,852.02   TOTAL PAST DUE AMT: 2,566.98

FIG. 9A

| | | |
|---|---|---|
| PRINT DATE: 11/16/89 | PRELIMINARY INVENTORY CHECKLIST | PAGE 2 |
| LAST UPDATE: 10/16/89 | SEQUENCE: MFG, 0-9 SERIAL NO | REPORT: F060 |
| PRINT TIME: 08:08 | | |
| BRANCH: 03138083 | DEALER NO: 02055  AVERY SALES AND SERVICE | FIN STAT DATE: 12/31/88 |
| | 2572 OLD 27 SOUTH | PRIOR F/C: 10/09/89 |
| | PRIOR F/C BY:  ANN MARIE FOX | |
| | CURRENT F/C BY:  BRIAN D. LINTON | |

---------- DEALER TOTALS ----------

| RECAP | | AMOUNT UNPAID | | AMOUNT COLLECTED | |
|---|---|---|---|---|---|
| CREDIT LINE: | 150 | INSURANCE: | 0.00 | SAU: | 3,195.02 |
| NO ITEMS | 27 | UNPAID CHGS: | 0.00 | PAID: | 0.00 |
| TOTAL D/S | 77,251.23 | PAST DUE: | 2,566.98 | CURT: | 135.10 |
| | | SAU: | 0.00 | CHGS: | 0.00 |
| | | | | INS: | 0.00 |
| | | TOTAL: | 2,566.98 | | |
| | | | | TOTAL: | 3,330.12 |

ITEMS BY STATUS

| CODE | ITEMS | BALANCE | CODE | ITEMS | BALANCE | CODE | ITEMS | BALANCE |
|---|---|---|---|---|---|---|---|---|
| ✓ | 15 | 48,650.15 | CV | 1 | 4,673.00 | C | 3 | 7,582.00 |
| * | 1 | 2,846.53 | S01 | 1 | 1,805.00 | DIS | 1 | 1,987.04 |
| INS | 1 | 3,730.00 | RTD | 1 | 995.53 | PD | 1 | 1,987.04 |
| FIX | 1 | 1,775.00 | DGM | 1 | 1,215.94 | | | |

REPRESENTATIVE'S CERTIFICATION TO ITT COMMERCIAL FINANCE CORP.

I HAVE PERSONALLY SEEN AND CHECKED THE SERIAL NUMBERS ON THE MERCHANDISE LISTED ABOVE AND CERTIFY THAT THE INFORMATION I HAVE GIVEN IS TRUE AND ACCURATE IN ALL RESPECTS

_____      _____
DEALER SIGNATURE                DATE

_____      _____
REPRESENTATIVE SIGNATURE        DATE

FIG. 9B

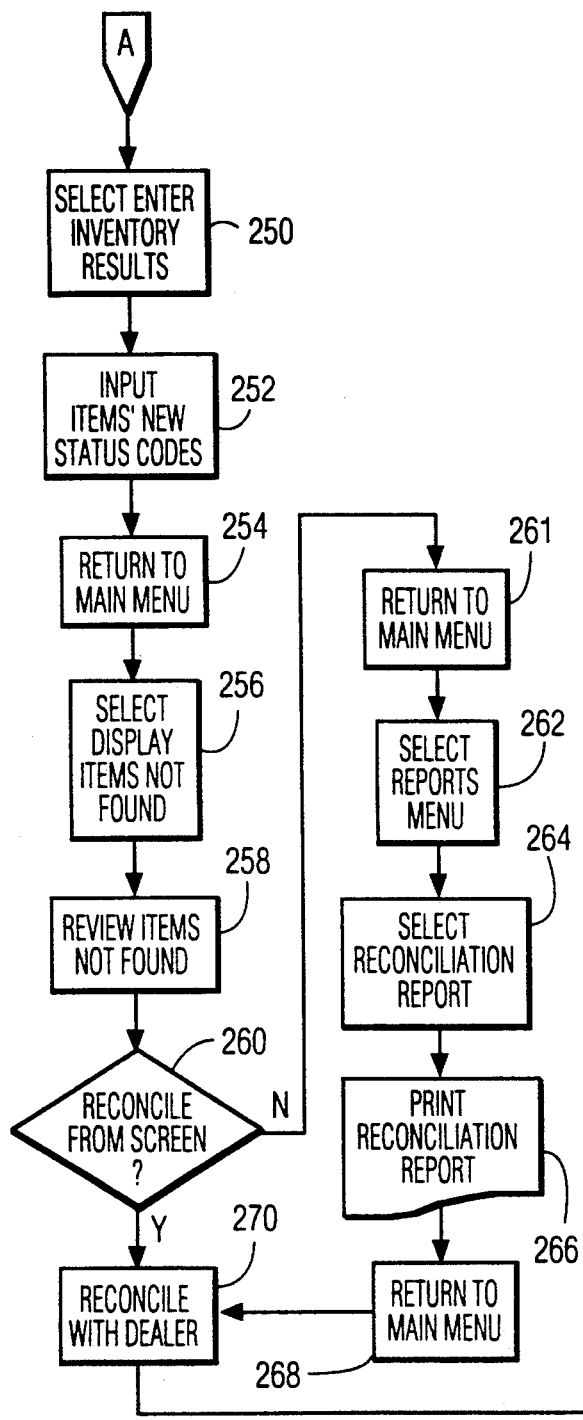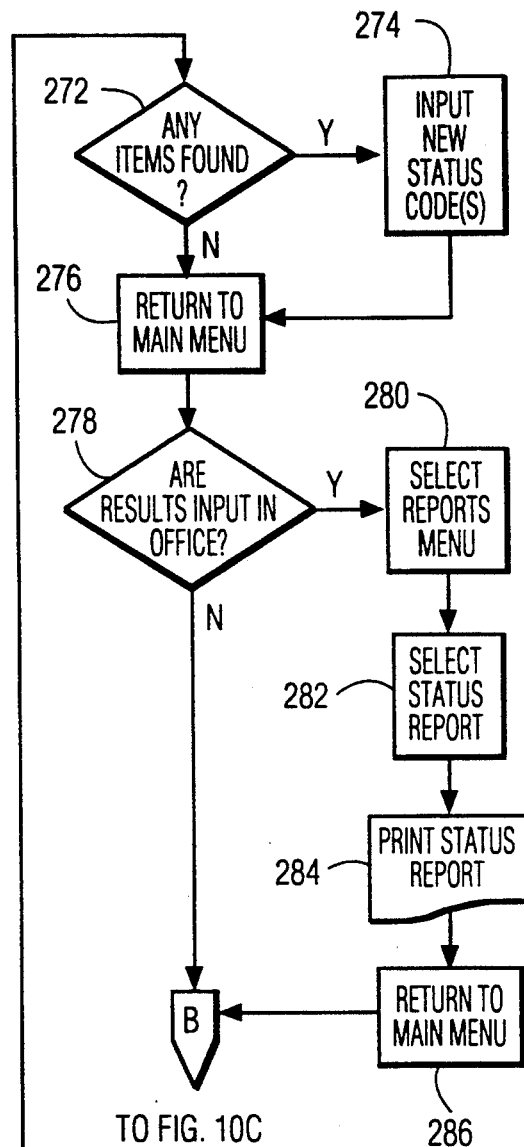
FIG. 10B

COMPUTERIZED INVENTORY MONITORING AND VERIFICATION SYSTEM AND METHOD

FIELD OF THE INVENTION

This invention relates to computer systems and data processing methods, and more particularly to such systems for remote inventory verification and monitoring.

BACKGROUND OF THE INVENTION

The monitoring and verification of inventory is a necessity in a wide variety of industries. Virtually every manufacturer who stores his goods in a warehouse for any period of time, must monitor and verify the type and quantity of goods in inventory. This process is not limited to those who make their own products, for instance, where a softdrink company uses outside bottlers to manufacture its product, the softdrink company must periodically visit the bottler to establish raw material usage and actual finished product inventory. Still further, finance companies who rely on the goods in the possession of a dealer as collateral must frequently establish the location and condition of such goods.

The financing of retail inventory, known as "floorplanning", is primarily "pay-as-sold" financing. With this technique, items are first purchased by a finance company and then shipped to a dealer or distributor. When an item is sold, the dealer pays the finance company the purchase amount plus the applicable interest charges. The finance company retains title to the inventory as collateral until the "loan" is paid off. As such, the finance company, to protect its interests, must verify the status of the items maintained by the dealer on a regular basis. To ensure that all financed items are at the dealer's location and in saleable condition, representatives of the finance company visit these locations to inspect the inventory. This inspection process is known as an "audit" or "floorcheck."

With most current systems and methods, when a representative of the finance company (an auditor) arrives at a dealer location, he begins the audit by performing a physical inventory of all financed items (FIG. 1 is a flow chart depicting this prior art work flow). This usually involves a check of the serial numbers of the items, but, in certain situations, may be simply a check of the items' model numbers. The status of each item is recorded, with particular attention paid to those items that are not found in inventory and are not yet sold (e.g., returned to manufacturer, in for repair, etc.). The results of the physical inventory are reconciled with the dealer against his records. An invoice is prepared for insurance premiums, overdue charges, interest charges and all items which have been sold. Money is collected from the dealer for the amount owed. The auditor leaves the dealer a copy of each inventory inspection sheet with the handwritten notations of each item's status. Lastly, a copy of the auditor's paperwork is sent to the finance company with the inventory results and remittances. (If the auditor is performing the work on a charge basis, he must prepare a bill to assess the proper party for the expense of the audit.)

Typically, the inventory is performed from an Inspection Checklist which is produced by one of the finance company's computers and mailed to the auditor. In many cases, a week's worth of checklists are prepared at once and mailed together to the auditor. Because of workload, mail delays, charge based audits and other factors, a checklist may be as many as 7 to 10 days old at the beginning of the inventory. Since dealers are obligated to pay the finance company for an item as soon as it is sold and since new financed inventory items are continually added, the auditor must contact the finance company just prior to the audit to manually update the checklist to determine exactly which items should be examined during the inventory. This procedure generally requires from five to twenty five on a telephone at the dealer's place of business, usually at long distance rates.

Sometimes, after the checklist has been updated, the sequence of the items on the checklist is not appropriate to smooth conduct of an inventory. In such cases, the auditor will prepare a new handwritten checklist to facilitate the inventory procedure. This is a time consuming task.

As the inventory is taken, the auditor marks codes on the checklist to identify the status of the various items (e.g., =serial number checked, PD=Paid off, DEM=demo, etc.). searches for and attempts to determine the status of every item on the list. If the auditor does not find an item which is on the checklist, no status is indicated and the item must be reconciled with the dealer unless previously paid off.

When the physical inventory is complete, all items not found, which have not been paid off, are noted. These items require reconciliation with the dealer's records. In many audits the list of items is so large that the auditor must spend a significant amount of time reviewing the items on the checklist to ensure that all applicable items are reconciled with the dealer.

Frequently, the reconciliation process requires more time than the physical inventory. Because of the intense concentration involved, the size of the inventory and the number of handwritten comments and codes, items that have already been sold may be missed by the auditor. In such situations, no collection is made for these items and the finance company is subject to financial loss.

After the reconciliation, the auditor prepares an invoice indicating the amount to be paid by the dealer. Data items (e.g., serial numbers, item numbers, model numbers and amount due) are copied from the checklist to an invoice. The amount owed by the dealer is totalled from: (1) the items which have been sold but not yet paid off; (2) outstanding charges; (3) interest payments; and (4) insurance premiums. The auditor receives payment from the dealer to resolve the total amount owed.

For audits which are on a charge basis, the auditor must record his time as well as other inventory information on a form. The form is sent to the finance company's authorizing office, the cost of the audit is calculated and a bill is sent out. This task is particularly onerous if the audit involves several clients. A motorcycle dealer, for instance, could sell products made by four different manufacturers and managed (financed) by four different clients (finance companies). In such a case, the cost to each client is calculated based on a percentage of the number of items managed by the client as compared to the total number of items in the inventory. All data from the audit is then sent to the authorizing office.

Since a significant number of auditors do not work near a finance company office, the paperwork is either mailed or delivered overnight by courier. When the paperwork is received, the auditor's Inspection Checklist is analyzed, and the information entered into an office computer (this could be the finance company's mainframe computer, but could also be any other computer which uploads information to the mainframe). Since the data is entered from the comments and handwritten codes provided on the auditor's checklist, numerous errors tend to occur. Often, significant sums received from dealers are placed in suspense, that is, not applied to any account, because the checklist and invoice are either unreadable or incorrect. This results in financial loss to the finance company and damage to customer goodwill.

When a company employs hundreds of auditors who perform over 1,000 audits daily, the auditing process represents a significant cost of doing business. As such, every extra step or cost incurred by an individual auditor is multiplied so that inefficiency becomes extremely expensive.

As described above, a number of problems are inherent in the present (prior art) audit system: (1) inventory checklists are frequently out of date at the time of the audit; (2) the auditor and a finance company representative have to update the checklist on the phone involving a large expenditure of time and (usually) long distance charges; (3) auditors spend a lot of time manually preparing inventory worksheets, invoices, and other documentation; (4) reconciliation based on handwritten notations on checklists requires too much time; (5) the handwriting of auditors is frequently unreadable, leading to inaccurate computer input and loss of financial remuneration; (6) involvement of the finance company offices in the audit process is intensive and time consuming; and (7) mail and overnight shipping charges constitute a large expense.

OBJECTS OF THE INVENTION

Accordingly, it is an object of the present invention to provide a system and method for alleviating the foregoing problems and improving upon the prior systems and methods.

It is another object of the present invention to provide accurate and up-to-date inventory records at the time of an audit.

It is a further object to reduce the time required to perform an audit by providing an automated system to support the audit process.

It is another object to reduce the amount of time required to reconcile with a dealer and to provide the dealer with a current, readable inventory report.

It is a still further object to reduce the office time spent prior to an audit in preparing, printing and distributing Inspection Checklists and after an audit in reviewing the results, entering data and conferring with the auditor.

It is an additional object to lower the cost of audits by eliminating the need to send Inspection Checklists by mail or courier.

It is yet another object to reduce a finance company's loss exposure by creating a more accurate audit system.

SUMMARY OF THE INVENTION

In accordance with the present invention, there is provided a system and method for monitoring and verifying inventory. To illustrate the capabilities of this system and method, reference is made to the auditing of the inventory of retail dealers for a finance company. This reference should not be construed as a limitation on the application of this system and method to other inventory situations.

The system of a preferred embodiment of the present invention includes a case, containing within it a lightweight microcomputer with at least one disk drive, a printer, and a modem. Software, for substantially automating the audit process is stored on a floppy disk or a Winchester drive where it is accessible by the microcomputer. This system is preferably portable and designed so that an auditor can use all the components without removing them from the case and without attaching cables, loading paper, etc. Since most auditors do not work out of an office, the system of the present invention can be used at home, in a hotel room, at a dealer site or any other temporary workplace.

An auditor will generally use the system of the present invention prior to undertaking any audits for a given day to obtain current inventory information and to prepare forms for that day's dealer inventories. The auditor turns on the microcomputer, logs on via a password and connects a telephone cable to any standard telephone jack. In response to prompts displayed on the display screen of the microcomputer, the finance company office number and dealer number corresponding to each dealer scheduled for an audit are entered through the computer keyboard. The computer then automatically dials a mainframe computer, sends the mainframe a request for information, receives, in turn, the dealers' inventory data and stores it in a semi-permanent memory device (e.g., on a Winchester drive). When these steps are completed (usually three to ten minutes), the auditor can review the status of each dealer's inventory from a number of displays. For example, a summary showing financial information and totals by manufacturer, status code, etc. is available as well as detail for each item on file. Notes from the finance company about the account are also downloaded, and are accessible by the auditor.

After reviewing the information, the auditor prints one or more of six different reports specifically designed for use in conducting a physical inventory. The selection is based on the type of product being checked, the manner in which the product is stored, the quantity of products and the auditor's preferences. At least one inventory report is ultimately selected for each dealer being checked that day.

At the dealers' location the auditor performs the physical inventory, noting the status of each item on the inventory checklist. At the conclusion of the inventory, the auditor enters the status of each item in the portable computer from the checklist. In order to minimize the amount of keystrokes, the auditor points to the inventory item on the display using the cursor controls keys and makes a one or two key entry for the status code. (It should be understood that the system and method of the present invention are designed to minimize keystrokes and to be as "user friendly" as possible. The auditor is guided through the audit process by a series of display screens which encourage the appropriate actions.)

After the entry of all the status codes, the system of the present invention will automatically display or print all items to be reconciled with the dealer. This ensures that all items are accounted for. If an item is not found and not out for repair or the like, the balance due for that item is accumulated.

When the reconciliation is complete, the auditor enters the amount the dealer will pay for all "missing" items. In order to minimize errors, it is not necessary to type the amount owed for each item directly, rather, it is possible to press one key for the total amount for the item, another key for the past due amount or a third key for a percentage of the total. Upon request, the system prints a Remittance Advice form (invoice) which includes a description of each item, charges and insurance premiums (if applicable) and total amount due.

After the invoice is complete and printed, a Final Inventory Report is printed which indicates the status of every financed item in stock, the amounts owed and collected and total items by status code. This report can be customized to present a sequence most desirable to the dealer and auditor.

The inventory process is repeated at each dealer on the day's schedule. If the inventory results must be re-keyed into a computer, a list is printed which includes all inventory items which have had a change of status. Alternatively, if the finance company's mainframe is appropriately configured, the status of the inventory can be automatically transferred via a modem and phone lines to the mainframe. In this embodiment of the present invention, the system prepares the data for transfer to the mainframe at the same time the next day's inventory records are requested.

If the audit was performed on a charge basis, the auditor enters the time spent on the audit and the system automatically prints a billing statement that allocates the cost to each participating client. Thus, the auditor does not need to undertake the calculations necessary to determine costs and allocations and then manually prepare a billing statement.

The present invention is also self-modifying. In other words, it can automatically incorporate changes to itself required by changes in business practices, company policies, technology or laws. Changes are developed and stored on a mainframe computer at the finance company. Upon request, the system establishes communication with the mainframe and retrieves the changes. The system then takes the necessary action to incorporate the changes. There are no files to be copied or deleted by the auditor. It is all done for him.

BRIEF DESCRIPTION OF THE DRAWINGS

In the drawings:

FIG. 4 is a representation of a portion of a Small Dealer Inspection Checklist;

FIG. 5 is a representation of a portion of a Preliminary Inventory Checklist;

FIG. 6 is a representation of a portion of a 0-9 Inventory Count

FIG. 7 is a representation of a portion of a Model Check Count Sheet;

FIG. 8 is a representation of a portion of a Remittance Advice form;

FIGS. 9A and 9B together are a representation of a portion of a Final Inventory Checklist; and FIGS. 10A-10C together comprise a flow chart depicting a typical work flow in accordance with the system and method of the present invention.

DETAILED DESCRIPTION OF THE INVENTION

As indicated in a previous section, reference is made to the auditing of the inventory of retail dealers for a finance company to illustrate the features and capabilities of the system and method of the present invention. It should be understood that this is a description of only one preferred embodiment and other embodiments may be accordingly prepared by one of skill in the art.

Figure 1:
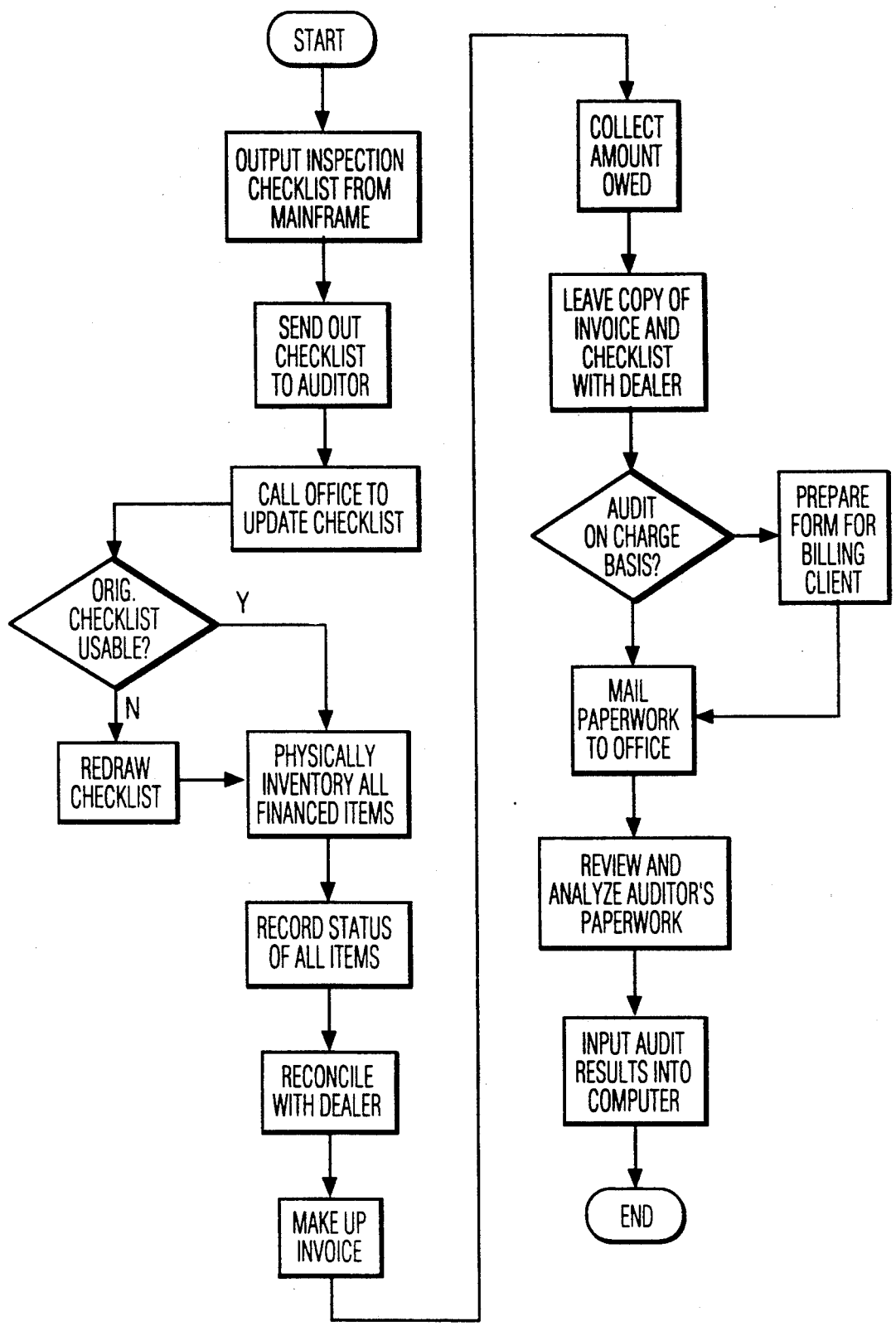
FIG. 1 is a flow chart depicting the prior art work flow.
Figure 2:
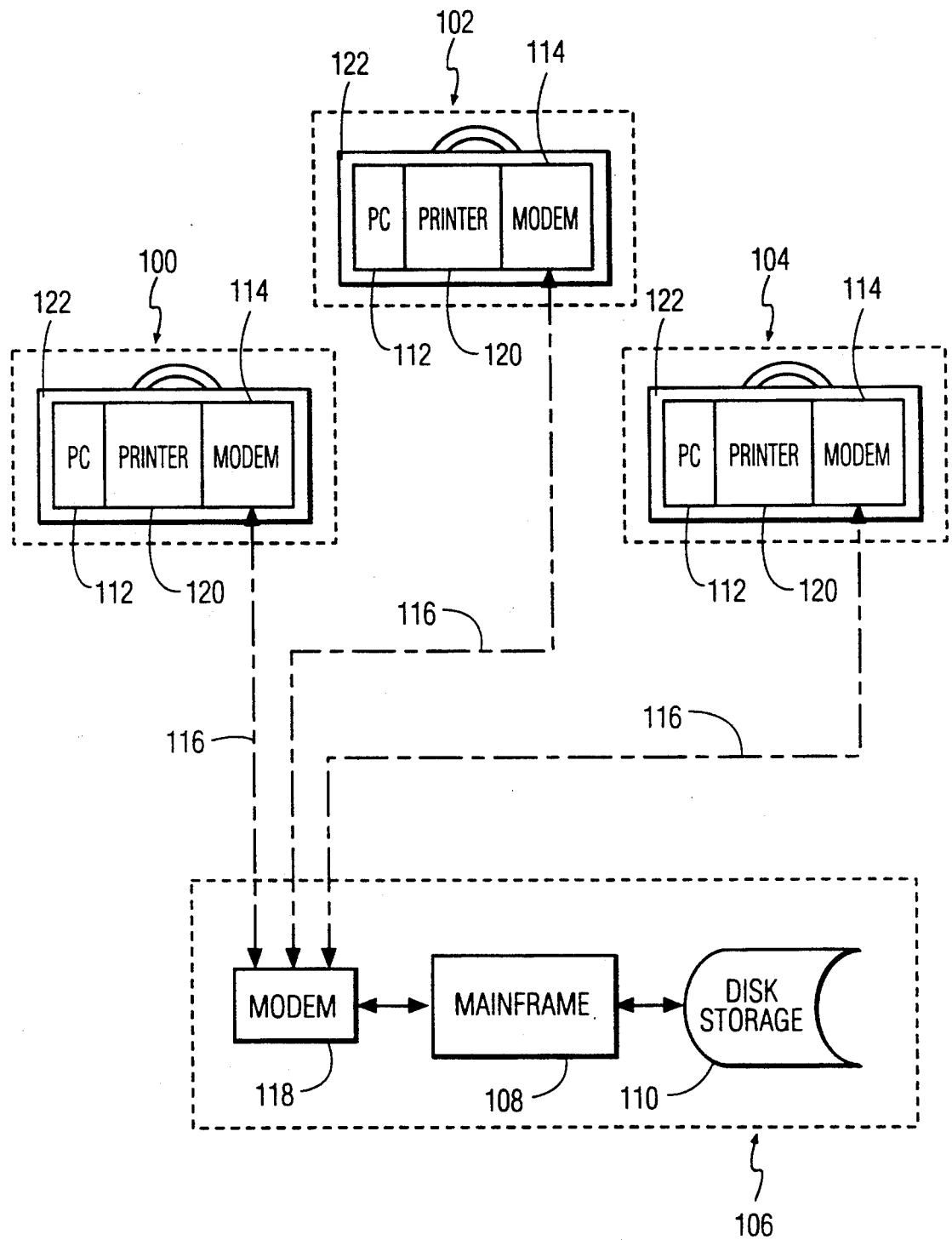
FIG. 2 is a schematic diagram of a preferred embodiment of the system of the present invention.

FIG. 2 schematically illustrates the system of the present invention. The system includes: portable data processing equipment at a plurality of stations 100, 102, and 104; and mainframe data processing equipment at another station 106. (Although only three portable data processing stations are shown in FIG. 2, it should be understood that it is preferred to use more stations than three.) In a preferred embodiment stations 100, 102 and 104 are not at a fixed location and are each remote from the mainframe data processing station 106.

The mainframe data processing equipment 108 is typically located at the finance company home office. In a preferred embodiment of the present invention, the mainframe data processing equipment comprises an IBM ® 3090 computer; however, any general purpose digital computer can be employed which has sufficient speed and capacity for processing data in the system. Also located at the mainframe data processing station 106 is a data storage system 110 which supports the mainframe 108 at the mainframe data processing station 106.

In a preferred embodiment of the present invention a lightweight (portable) microcomputer ("PC") 112, such as an NEC ® Multispeed HD, is located at each portable data processing station 100, 102 and 104. The portable computer 112 is preferably supported by a Winchester drive ("hard disk") storage device (not shown) and a floppy disk drive (not shown) which is capable of reading and storing data to and from properly formatted floppy disks (not shown).

Each portable data processing station also includes a modem 114 (preferably an internal modem), which is used for sending and receiving data over telephone lines 116 to a modem 118 provided at the mainframe data processing station 106. Additionally, output printing equipment 120 is provided at each portable data processing station 100, 102 and 104. This printing equipment 120 permits hard copies to be made of any data stored or received by the portable computer 112.

All the equipment located at each portable data processing station is preferably "cabled" together and contained in a lightweight, durable carrying case 122. Thus, all the equipment at these stations 100, 102 and 104 can be permanently maintained in the case 122.

When an auditor wishes to use the system of the present invention, he opens the cover (not shown) of the carrying case 122 and raises a display screen (not shown) associated with the portable computer 112. The PC is turned on and a routine is invoked which automatically brings a menu to the display.

Figure 3A:
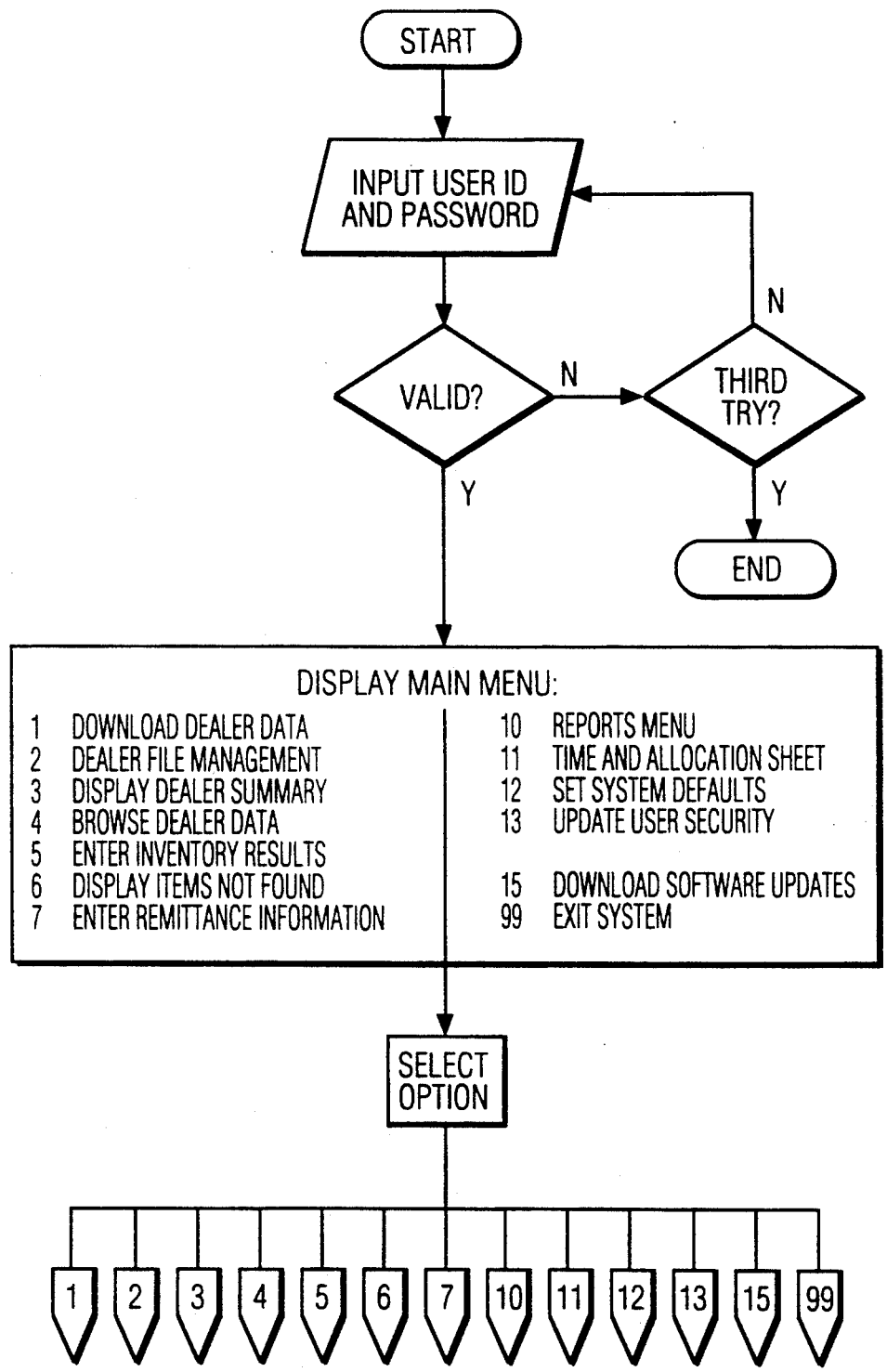
FIG. 3A-3M together comprise a flow chart illustrating the computer program and operative steps associated with a preferred embodiment of the present invention.

In order to prevent theft of data, system vandalism, industrial espionage, etc., a security function is provided which governs entry to the system of the present invention (See FIG. 3A). When a user wishes to access the system of the present invention, an initial screen is presented which prompts the user for a number and a password (see Table I). If the user does not respond with the correct information a message appears and the operator is prompted to re-enter the correct term. If the proper term is not entered within three tries, the system will automatically exit without granting access to any further screens.

TABLE I
APPLICATION ACCESS

FSR Number: [ ]
Password: [ ]
SYSTEM CONFIDENTIAL

Figures 3B, 3C:
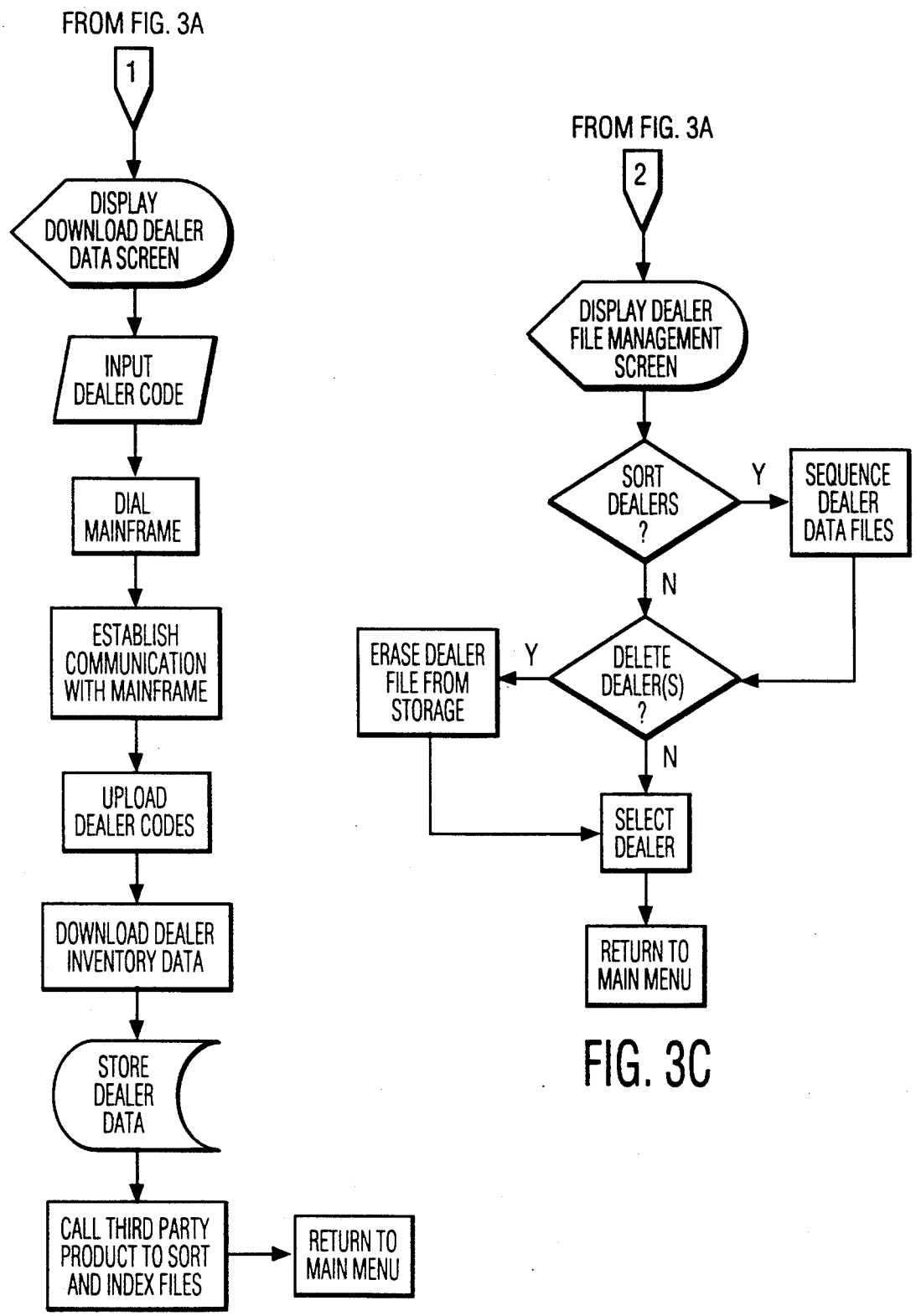

Each potential user of the system is assigned to a particular security level based on his responsibilities. The security level is used to limit the system functions which can be accessed by the user. Initially, every user of the system is assigned a user number and a password. These terms are established in the system by authorized persons and stored in encrypted format on the PC's hard disk (See FIG. 3L). The encryption algorithm ensures that the passwords and user numbers can not be viewed by unauthorized personnel, even those skilled in microcomputer use. (As an added security measure, the password is not shown on the display as it is entered.)

Table II shows the Update User Security screen which permits an authorized person to establish user ID's and passwords for up to five users on a given PC. In order to add a user, a user number from 1 to 5 is chosen. The name of the user, his branch number and his security level are input. A password is also chosen and entered. After all the users have been added, a function key is pressed to save the data.

TABLE II

PAD ID: R251
UPDATE USER SECURITY

| Nr | FSR Name | Branch | Password | Access |
|---|---|---|---|---|
| 1 | [Jack Snodgrass ] | [01136007] | [N1 ] | [S] |
| 2 | [Henry Thermidore ] | [01136007] | [POP ] | [N] |
| 3 | [Johnny OneNote ] | [01136007] | [N3 ] | [S] |
| 4 | [ ] | [ ] | [ ] | [ ] |
| 5 | [ ] | [ ] | [ ] | [ ] |

Access code is N for Normal use, S for full security rights
ESC: Exit    F1: Help    F10: Save When the correct user number and password are entered, a Main Menu (shown in Table III) is presented. This menu provides a single entry and exit point to all further system functions and screens (See FIG. 3A). In order to select an option, the number of that option is typed and 'Enter' is pressed. The system of the present invention will then display the next screen appropriate to the selected option.

TABLE III
MAIN MENU

| 1 Download Dealer Data | 10 Reports Menu |
|---|---|
| 2 Dealer File Management | 11 Time & Allocation Sheet |
| 3 Display Dealer Summary | 12 Set System Defaults |
| 4 Browse Dealer Data | 13 Update User Security |
| 5 Enter Inventory Results | 14 Curtis-Mathes Model Selection |
| 6 Display Items Not Found | 15 Download Software Updates |
| 7 Enter Remittance Information | 99 Exit FAST System |

Additional information is available, through a "Help" window, for each screen as it is displayed. The Help window for a particular screen is written over the screen, generally using only a portion of the PC's display. These Help windows, which may be requested at any time, are accessed by pressing a particular function key (F1).

Before undertaking an audit, an auditor must obtain information about a customer and his inventory from the finance company. This information is transferred from the finance company's mainframe computer 108 to the hard disk on the auditor's PC 112. In order to specify the appropriate data to be downloaded from the mainframe 108 a Download Dealer Data screen (shown in Table IV) is used. This screen, which is accessed by choosing an option (1) from the Main Menu, provides a series of prompts for inputting up to 12 dealer identification codes. In a preferred embodiment of the present invention, the dealer codes are comprised of both a branch number and a dealer number. In this embodiment, a default branch number is provided to minimize typing. This default number is automatically prefilled to the branch number field when 'Enter' is pressed. Still further, the immediately preceding branch number can be repeated by typing a slash ("/") in the first position of the branch number field, and pressing 'Enter'.

TABLE IV
DOWNLOAD DEALER DATA

| | Branch | Dealer | | Branch | Dealer |
|---|---|---|---|---|---|
| 1 → | [ ] | [ ] | 7 → | [ ] | [ ] |
| 2 → | [ ] | [ ] | 8 → | [ ] | [ ] |
| 3 → | [ ] | [ ] | 9 → | [ ] | [ ] |
| 4 → | [ ] | [ ] | 10 → | [ ] | [ ] |
| 5 → | [ ] | [ ] | 11 → | [ ] | [ ] |
| 6 → | [ ] | [ ] | 12 → | [ ] | [ ] |

Dialing prefix:    [T9,, ]
Number of dealers currently present: 12
ESC: Exit    F1: Help    F2: Prefix    F4: Cellular    F9: Recall    F10: Transmit When all desired dealers have been entered through the Download Dealer Data screen, the system automatically formats the data into a form understandable to the mainframe 108, dials the preset number of the mainframe 108 and transmits the dealer codes (See FIG. 3B). (The dialing, transmitting and receiving of data is performed by the PC's modem 114 which is connected, by the auditor, to any standard telephone jack. On the other end of the line, the mainframe 108 transmits and receives the data through its own modem 118.) The mainframe 108 treats the transmitted information as a request for the inventory records of the identified dealers and sends the appropriate data back to the PC. Upon receipt of all of the files, the system of the present invention verifies that the communications process was successful, disconnects the phone line, stores the inventory information in a random access disk file on the hard disk, and issues a call to a third party product installed on the disk (OPT-TECH SORT® Software by Opt Tech Data Processing) to build sorted key files for sequencing the data. Each dealer file is processed in seven phases. The first phase sets up the dealer file and places data in it. The next six phases sort the dealer file and set up indices to keep the file in sequence. (These last six phases are carried out by the OPT-TECH SORT ® software).

A list of dealer files currently stored on the disk is automatically maintained by the system and is available for review by selecting Option 2 from the Main Menu. Table V shows the Dealer File Management screen which is displayed with the selection of Option 2. From this screen, the user can delete a dealer file, sort the data in a special sequence for handling certain inventories, or select a particular dealer for further action (See FIG. 3C). An arrow can be moved up and down the screen, with cursor control keys, to point to the desired dealer for which action is required. In order to select a dealer for audit and/or review purposes an appropriate function key (F2) is pressed. After this selection, the user is not required to type the dealer or branch number again.

In order to obtain information about the selected dealer's status and total inventory, a Dealer Summary Display screen (shown in Table VI) is available by selecting Option 3 from the Main Menu. The Dealer Summary Display screen is divided into two parts, the top shows various data elements relative to the financial position of the dealer, while the bottom part shows the number of items, per manufacturer, in the dealer's inventory. From the Dealer Summary Display screen, three other screens may be selected: (a) an Address Display screen (see Table VII) showing the dealer's address and comments about the dealer (usually input to the mainframe by a finance company account manager); (b) a New Status Display screen (see Table VIII) showing the total items and outstanding balance by new status code (new status codes are those input by the auditor following the audit); and (c) a Status Display screen (see Table IX) showing the number of items and balance by old status code (these status codes are those

TABLE V

DEALER FILE MANAGEMENT

| Dealer Name | Dealer Number | Office Name | Office Number | Date Rec'd | Date Checked |
|---|---|---|---|---|---|
| RED'S STEREO & APPLI | 01010 | ITT CINCINNAT | 01356014 | 99/99/99 | |
| CYCLE CENTER, INC. | 103258M | ITT ST. LOUIS | 01256015 | 99/99/99 | |
| BIXBY'S YAMAHA, INC. | 35100 | ITT ANAHEIM/Y | 03058080 | 99/99/99 | |
| SOUND WAVE | 57450 | ITT CINCINNAT | 01356014 | 99/99/99 | |
| SBS BUILDING SUPPLY | 12641 | ITT SAN FRANC | 01056003 | 99/99/99 | |
| HONDA OF GREENVILLE | 100608M | ITT ATLANTA | 01106008 | 99/99/99 | |
| JAF MOTORS, INC. | 101691M | ITT BOSTON | 01216011 | 99/99/99 | |
| JAF MOTOR, INC. | 102855M | ITT BOSTON | 01216011 | 99/99/99 | |
| NICHOLS HONDA | 103251M | ITT ATLANTA | 01106008 | 99/99/99 | |
| BEAUDRY MOTOR COMPAN | 10579 | ITT PHOENIX | 01036030 | 99/99/99 | |
| GARDEN RENTALS & | 306710P | ITT TAMPA | 01096025 | 99/99/99 | |
| ESC: Exit   F1: Help   F2: Select   F3: Delete   F4: Sort   F7: PG 1   F8: PG 2 | | | | | |

030-70 All Dealers displayed

Figure 3D:
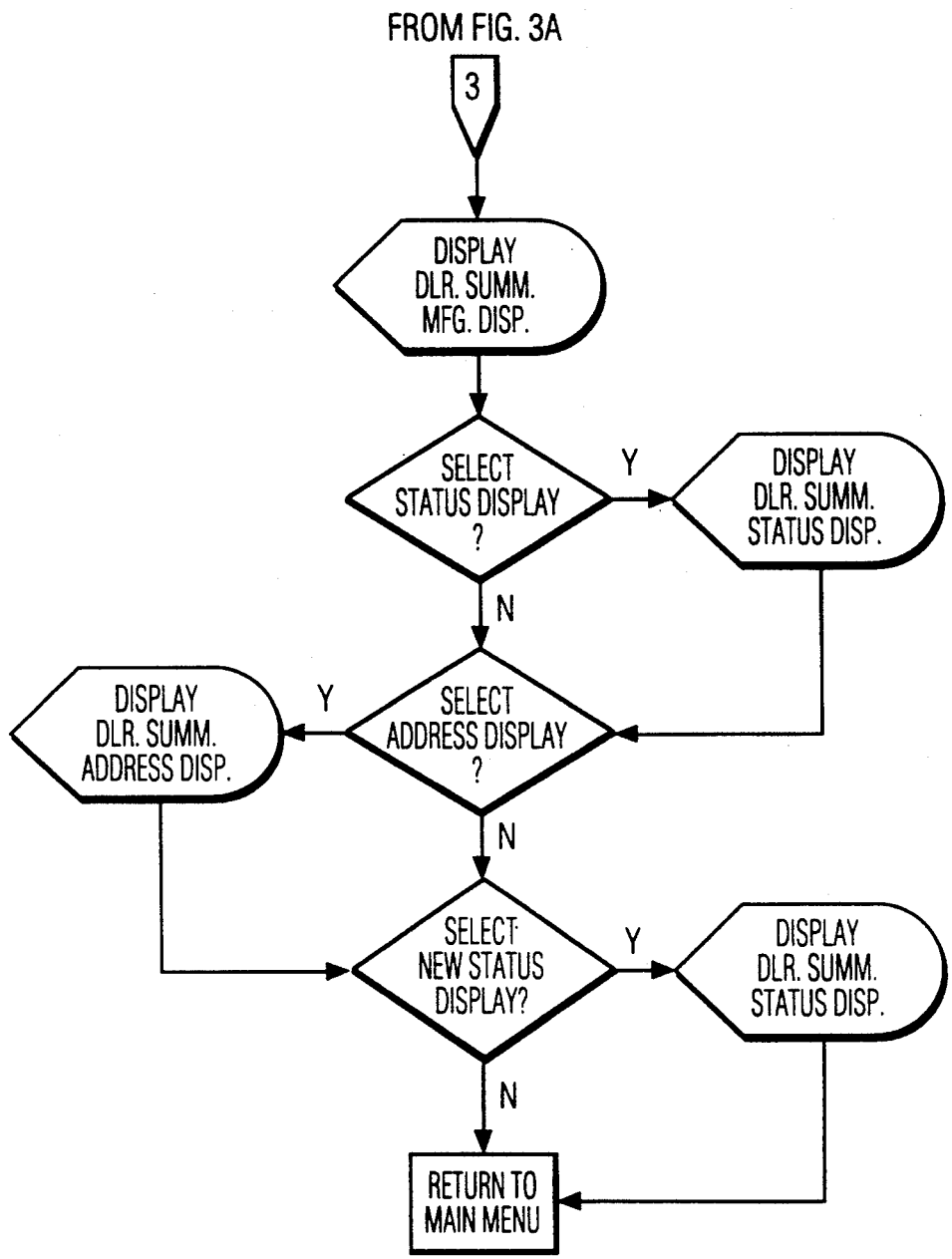

When the Dealer File Management screen is displayed, a message may appear in the data column for a particular dealer. These messages indicate that the data was not transferred correctly from the mainframe. For example "DLR NOT FOUND" means that the dealer code specified does not exist on the mainframe, "DLR PAID OFF" means that the dealer has no items with a balance due, "INCOMPLETE DLR" means that an error occurred during transmission and only a partial file was downloaded and "OUT OF BALANCE" means that the total outstanding charges and the number of items downloaded versus the totals maintained by the mainframe do not match. When either of the last two messages appear, the download for the dealer should be retried to obtain the correct data.

originally downloaded from the mainframe) (See FIG. 3D). These screens are not tied together and can be displayed in any sequence of simply not displayed at all.

TABLE VI

| Page 1 | | | | | | | MFG Display |
|---|---|---|---|---|---|---|---|
| | | DEALER SUMMARY DISPLAY | | | | | |
| Dealer Number: 01010 | | Dealer Name: RED'S STEREO & APPLIANCES | | | | | |
| Dlr Credit Line ($000): | | 31 | Total Outstanding: | | | | 72,424 |
| Unpaid Charges (0-30): | | 301 | Total No of Items: | | | | 252 |
| Unpaid Charges (30+) | | 0 | Fin Statement Date: | | | | 12/12/87 |
| Unpaid Ins Premium: | | 0 | Data of Last F/C: | | | | 02/23/89 |
| Total Past Due Amt: | | 10,619 | Current as of: | | | | 03/13/89 |
| | | | Check Performed By: ROBERT C. ELLIS | | | | |
| MFG Name | Items | MFG Name | Items | MFG Name | Items | MFG Name | Items |
| JVC | 9 | YAMH MUS | 195 | | | | |
| KENWOOD | 27 | | | | | | |
| ONKYO | 3 | | | | | | |
| RADIUS | 3 | | | | | | |
| UNKNOWN | 15 | | | | | | |
| ESC: Exit | | F6: New Status | | F7: Address | | F9: Status Display | |

TABLE VII

| Page 3 | Address Display |
|---|---|
| DEALER SUMMARY DISPLAY | |
| Dealer Number: 01010 | Dealer Name: |
| | RED'S STEREO & APPLIANCES |
| | Dealer Address |
| | 4001 EURY LANE, SUTIE 6 |
| | SOMERSET    KY    42501 |
| | Tel: (606) 679-6692 |

TABLE VII-continued

Comments

BE SURE TO CHECK OUTLYING STORAGE BUILDING
ALSO
CALL BRANCH BEFORE LEAVING DEALER
ESC: Exit    F6: New Status    F8: MFG Display    F9: Status Display

TABLE VIII

Page 4                                        New Status Display
DEALER SUMMARY DISPLAY Dealer Number: 01010          Dealer Name:
                              RED'S STEREO & APPLIANCES

| Stat Code | No. Of Items | Balance | * | Stat Code | No. of Items | Balance | * | Stat Code | No. of Items | Balance |
|---|---|---|---|---|---|---|---|---|---|---|
| C | 44 | 8,231.26 | | | | | | | | |
|   | 130 | 34,475.40 | | | | | | | | |
| CV | 4 | 2,208.00 | | | | | | | | |
| DEM | 6 | 4,770.00 | | | | | | | | |
| DIS | 1 | 240.00 | | | | | | | | |
| PD | 10 | 4,631.45 | | | | | | | | |
| RTD | 31 | 5,643.96 | | | | | | | | |
| SAU | 26 | 12,223.80 | | | | | | | | |

ESC: Exit    F7: Address    F8: MFG Display    F9: Status Display

TABLE IX

Page 2                                        Status Display
DEALER SUMMARY DISPLAY Dealer Number: 01010          Dealer Name:
                              RED'S STEREO & APPLIANCES
                Items with Non-blank Status

| Status | No of Items | Balance | Status | No of Items | Balance |
|---|---|---|---|---|---|
| RTD | 33 | 6,544 | | | |
| DEM | 3 | 4,200 | | | |

ESC: Exit    F6: New Status    F7: Address    F8: MFG Display

If it is desired to view a dealer's inventory items in more detail Option 4 (Browse Dealer Data) can be selected from the Main Menu. A Browse Dealer File screen (shown in Table X) lists each item in the dealer's inventory by invoice number, unit ID, product type, manufacturer name, model number and serial number. The user can browse through the file forward or backward at will. Any item can be displayed in further detail by pointing to that item with the cursor and pressing a detail display key (F9) (See Table XI and FIG. 3E). The sequence of the data can be changed by pressing a function key (F8) to display a Sequence screen (shown in Table XII), and selecting any of the available options. The sequence is changed immediately, and the Browse Dealer File screen is returned. No time is taken to actually sort the data on the disk.

TABLE X

Current Item:    19
Total Items:    252

BROWSE DEALER FILE

Dealer Name: RED'S STEREO & APPLIANCES
Dealer Number: 01010

| Invoice No | Unit ID | Old Status | Product | MFG Name | Model No | Serial No |
|---|---|---|---|---|---|---|
| 233713-00B | 029984-2 | RTD | AMPLIF. | UNKNOWN | KSAF1J | NSN |
| 31605701 | 043680-9 | | SPEAKER | UNKNOWN | D9H | NSN |
| 0563571 | 036059-9 | | SPEAKER | YAMH MUS | YCS-692 | NSN |
| 473704 | 030226-7 | | STEREO | KENWOOD | 664B | 0261 |
| 473704 | 030226-7 | | STEREO | KENWOOD | 664B | 0261 |
| 473704 | 030226-7 | | STEREO | KENWOOD | 664B | 0261 |
| 0581465 | 039073-2 | | CAS RECR | YAMH MUS | YCR-305 | 1143 |
| 0581465 | 039073-2 | | CAS RECR | YAMH MUS | YCR-305 | 1143 |
| 0581465 | 039073-2 | | CAS RECR | YAMH MUS | YCR-305 | 1143 |
| 259925-00 | 032166-1 | RTD | UNKNOWN | JVC | KSR18J | 1184 |
| 259925-00 | 032166-1 | RTD | UNKNOWN | JVC | KSR18J | 1184 |
| 259925-00 | 032166-1 | RTD | UNKNOWN | JVC | KSR18J | 1184 |

ESC: Exit    F1: Help    F3: Find    F8: Sequence    F9: Detail

TABLE XI

ITEM DETAIL DISPLAY

Dealer Number: 01010    Dealer Name:
                        RED'S STEREO & APPLIANCES
Invoice Date:           08/31/88    Manufacturer:    YAMH MUS
Maturity Date:          08/25/89    Model Number:    YCR-305
Invoice Number:         0581465     Serial Number:   1143
Item Number:            001         Product:         CAS RECR
Unit ID:                039073-2    Old Status:
Original Amount:        216.00      Status Date:     09/88
Present Balance:        216.00      New Status:
Amt Collected:          0.00
Past Due Amount:        0.00
Press any key to return . . .

TABLE XII

Enter the desired sequence number in the prompt below:
1 = Mfg, Model, Note Date (Descending)
2 = Note Date, Invoice, Item
3 = Serial No (last 6)
4 = Mfg, Model, Serial No
5 = Mfg, Model, Serial No (last 6)
6 = Mfg, 0-9 Serial No
7 = Mfg, 0-9 for boats
Enter choice here →

Figure 3E:
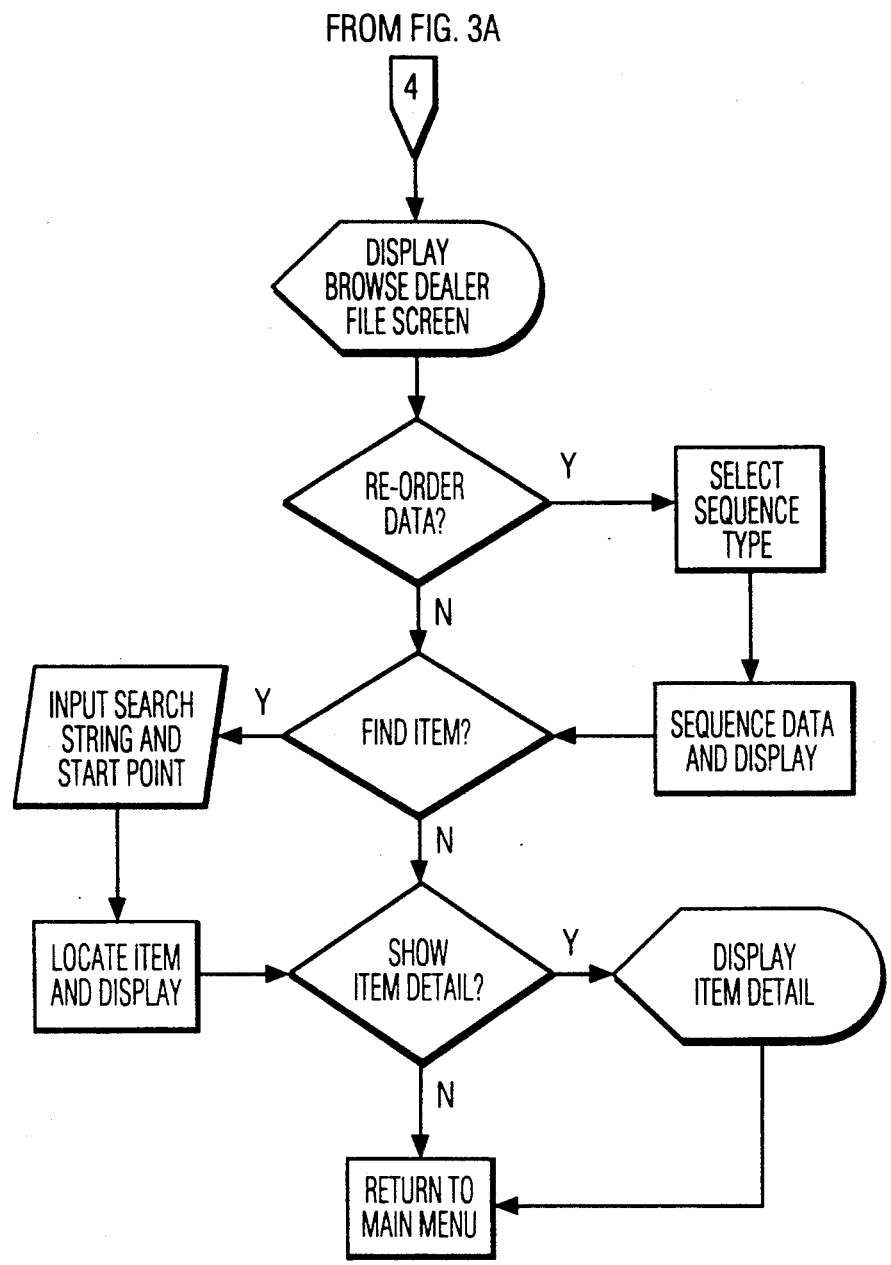

If a user wishes to display a particular item, a search facility is available to search the dealer file for any known field element (See FIG. 3E). This facility is accessed by pressing a function key (F3) from the Browse Dealer File screen. A Fast Item Search Facility window is then displayed (shown in Table XIII) which permits selection of the field to be searched, input of the term to be found, and input of the starting point for the search (i.e. from the first item in the file or from the item to which the cursor is pointing). If the search is successful, the pointer will stop at the first item that meets the search criterion.

TABLE XIII

Fast Item Search Facility

1 = Note Date    4 = Unit ID    6 = Manufacturer
2 = Invoice No.    5 = Model    7 = Maturity Date
3 = Serial No.
Enter the field number desired → 6
Enter the search argument (the data to search for) below. It is not necessary to key in the entire field, just enough to ensure a unique match.
Dates should be entered in the format MMDDYY.
Enter the search argument → [KENWOOD ]
Should the search start from the (C)urrent record or the (B)eginning of the file? Enter C/B → [C]

Figure 3F:
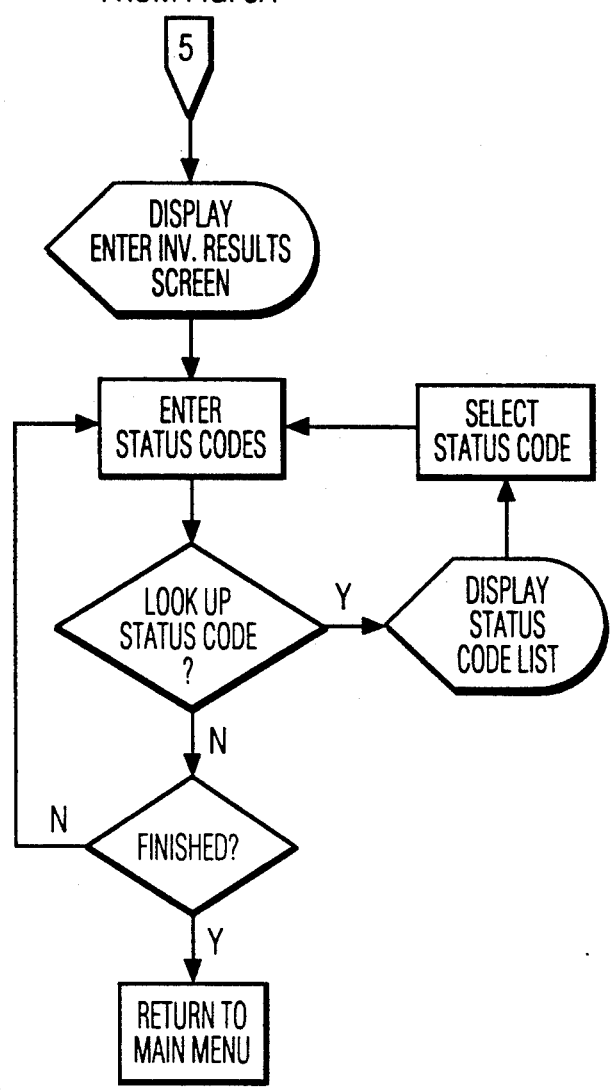

In order to enter the results of the audit, an Enter Inventory Results screen, shown in Table XIV, is available by choosing Option 5 from the Main Menu. This screen is very similar to the Browse Dealer Data screen, but includes the ability to accept the input of item status codes (See FIG. 3F).

TABLE XIV

Current Item: 1
Total Items: 252

ENTER INVENTORY RESULTS

Dealer Number: 01010    Dealer Name: RED'S STEREO & APPLIANCES

| Unit ID | Product | MFG Name | Model No | Serial No | Old Status | New Status | Rem |
|---|---|---|---|---|---|---|---|
| 043680-9 | SPEAKER | UNKNOWN | D9H | NSN | | | |
| 043680-8 | SPEAKER | UNKNOWN | D9H | NSN | | | |
| 036059-7 | SPEAKER | YAMH MUS | YCS-692 | NSN | RTD | RTD | |
| 029984-2 | AMPLIF. | UNKNOWN | KSA51J | NSN | RTD | RTD | |
| 036059-7 | SPEAKER | YAMH MUS | YCS-692 | NSN | RTD | RTD | |
| 043680-8 | SPEAKER | UNKNOWN | D9H | NSN | | | |
| 036059-9 | SPEAKER | YAMH MUS | YCS-692 | NSN | | | |
| 029984-2 | AMPLIF. | UNKNOWN | KSA51J | NSN | RTD | RTD | |
| 043680-8 | SPEAKER | UNKNOWN | D9H | NSN | | C | |
| 043680-9 | SPEAKER | UNKNOWN | D9H | NSN | | | |
| 036059-9 | SPEAKER | YAMH MUS | YCS-692 | NSN | | | |

F1: Help    F2: Serial    F3: Carton    F4: Model    F5: Find    F6: Rem    F7: Clear
ESC: Exit    ': Codes    F8: Sequence    F9: Detail    F10: Sold    END: Copy Before the status codes are input, the list of items to be inventoried should be sequenced in the manner used or to be used in the taking of the inventory. Just as with the Browse Dealer Data screen, the Enter Inventory Results screen may be sequenced in a variety of different ways by using a function key (F8) and making a selection from the displayed window.

The status of an item is entered by pointing to that item using the pointer (cursor control keys) and pressing the appropriate function key (the available function keys are displayed on the bottom of the screen to assist the user). Pressing one function key (F2) places a check mark next to the item and indicates that the serial number has been verified on the item. Pressing another function key (F3) shows that the serial number was seen on the original carton. If the proper code is not known, pressing the apostrophe (') key provides a list of status codes (shown in Table XV) in a window on the screen. The appropriate code can then be selected by moving the pointer adjacent to the code and pressing 'Enter' or by pressing 'Page Down' and entering the code directly. Other special codes are also available for selection through other function keys (e.g., F4=Model, F6=Rem and F10=Sold) which provide the auditor with additional flexibility in designating the actual status of the items.

TABLE XV

VALID STATUS CODES
To Select, Position the cursor and press enter
Or Press Page Down to enter a code directly
Snn-Paid prior to check. Enter check #
DIS-Dispute
INS-Stolen Items
RTD-Items returned or never received
PD-Item paid prior to check
FIX-Items in for repair
DEM-Demo item
RNT-Rental unit
CP-Contracts Pending
BIW-Boat in Water
FRT-Freight
REP-Reposessed item
CV-Verify item in crate
Enter here →

In practice, the user points to each item in turn and presses a single key (in most cases) to record the status code. It is important to note that the items' serial numbers, model numbers, etc. are not typed, rather only a single key is pressed to indicate the present status of each item. If the item is in stock, either F2, F3, or F4 is pressed to record the category, i.e.: the serial number was checked on the item, the serial number was checked on a sealed crate or the model number was checked. If another code is required, a single key (') is pressed to display additional codes, as described above. If an item is not found, it is left blank and assumed to have been sold. This status is verified with the dealer during the reconciliation.

Frequently, the same status code must be entered for a number of items in a row. This is particularly common in model number checks where serial numbers are not important. A status code can be repeated by pressing the 'End' key and responding to a prompt asking for the number of times the code should be copied. This technique can be used to clear a series of items whose codes were entered incorrectly by copying a blank status code.

Figure 3G:
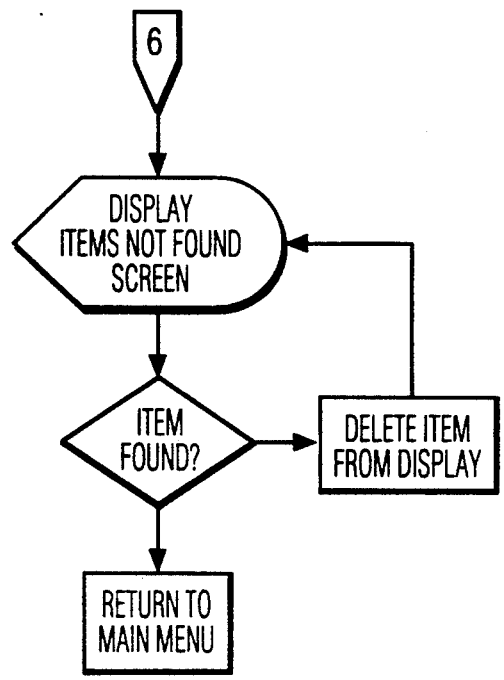

After all the status codes have been entered, the auditor must determine which items should be reconciled with the dealer. The selection of Option 6, from the Main Menu, displays a Display Items Not Found screen (shown in Table XVI). This screen automatically displays all items which were not found during the inventory. This screen is almost identical to the Enter Inventory screen except that all "found" items are omitted. If any items displayed on this screen are found during the reconciliation with the dealer, the new status codes are entered in the same manner as before (See FIG. 3G). All such items are automatically deleted from the Display Items Not Found screen when the pointer is moved.

TABLE XVI

DISPLAY ITEMS NOT FOUND

Dealer Number: 01010    Dealer Name: RED'S STEREO & APPLIANCES

| Unit ID | Product | MFG Name | Model No | Serial No | Old Status | New Status | Rem |
|---|---|---|---|---|---|---|---|
| 043680-8 | SPEAKER | UNKNOWN | D9H | NSN | | | |
| 043680-8 | SPEAKER | UNKNOWN | D9H | NSN | | | |
| 040276-0 | CAS RECR | YAMH MUS | YCR-305 | 4828 | | | |
| 046287-8 | CAS RECR | YAMH MUS | YCR-405 | 5137 | | | |
| 045683-8 | AMPLIF. | YAMH MUS | YPA-600 | 5531 | | | |
| 035353-6 | AMPLIF. | YAMH MUS | YPA-100 | 6538 | | | |
| 035353-6 | AMPLIF. | YAMH MUS | YPA-100 | 6538 | | | |
| 037158-1 | AMPLIF. | YAMH MUS | YPA-1000 | 6980 | | | |
| 037158-1 | AMPLIF. | YAMH MUS | YPA-1000 | 6980 | | | |
| 037158-1 | AMPLIF. | YAMH MUS | YPA-1000 | 6980 | | | |
| 037610-6 | CAS RECR | YAMH MUS | YCR-220 | 7230 | | | |

| F1: Help | F2: Serial | F3: Carton | F4: Model | F5: Find | F6: Rem | F7: Clear |
|---|---|---|---|---|---|---|
| ESC: Exit | ': Codes | F8: Sequence | F9: Detail | F10: Sold | END: Copy | |

000-50 Top of File Reached

Figure 3H:
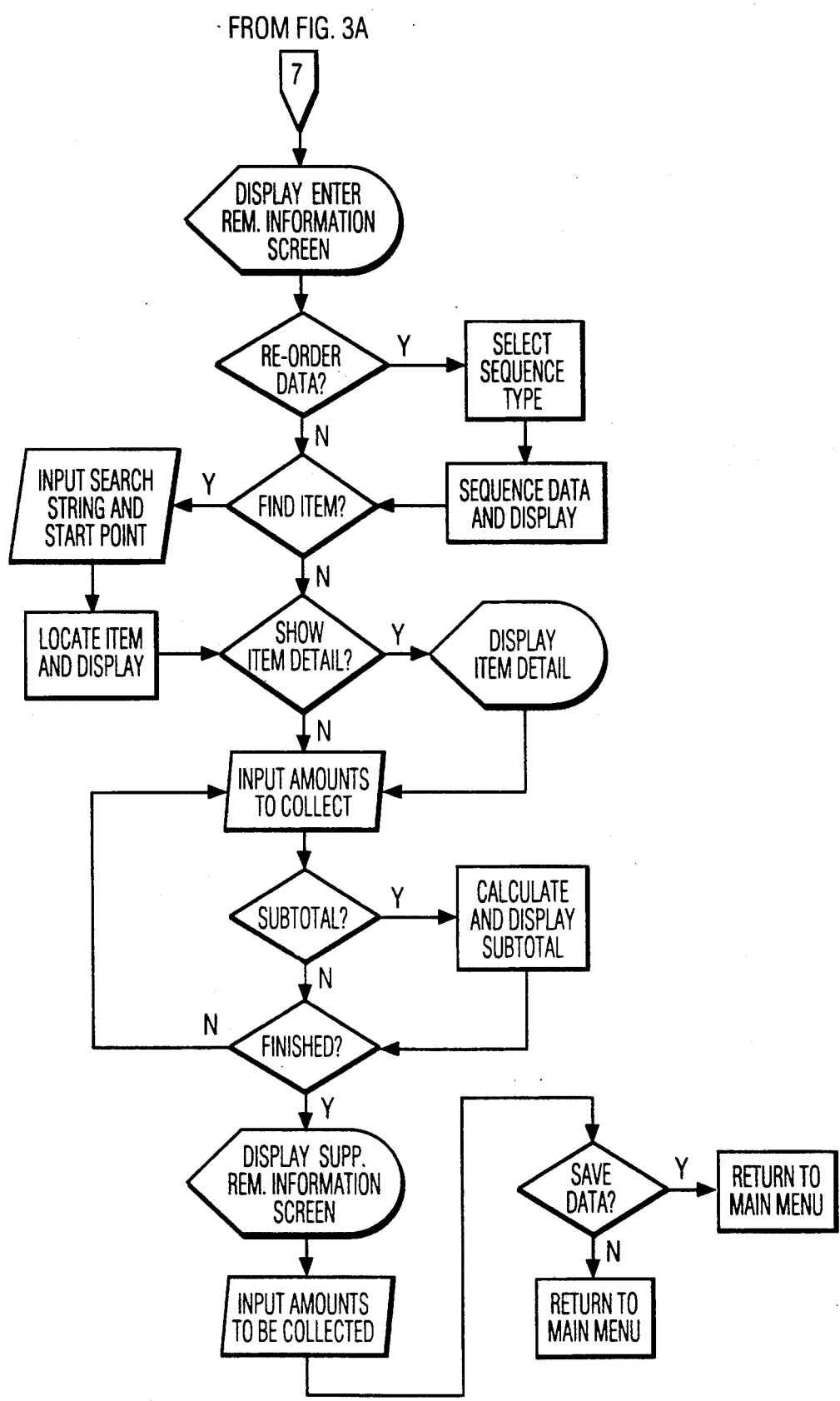

When the reconciliation is completed, Option 7 is selected from the Main Menu to display the Enter Remittance Information screen shown in Table XVII (See also FIG. 3H). Such items include those which have been sold but not yet paid for, those for which there is a past due amount and those for which the dealer wishes to make a payment. Since some dealers do not pay past due amounts, pressing a function Key (F2) will change the display to filter out those items. (Pressing the function key (F2) again will bring back the original display.)

the semicolon (;) is pressed to enter a past due amount and the apostrophe (') is pressed if the present balance is to be collected. When a percentage of the present balance is to be collected, a function key (F4) is pressed to enter the percentage Another function Key (F5) is pressed to enter the selected percent of the original balance. Alternatively, the user can enter an amount directly by using the numeric keys. At any time, a subtotal of the amount to be collected can be displayed by pressing a function Key (F6).

When entry of the amounts to be collected is completed, and 'ESC' is pressed, the system automatically displays a supplementary Enter Remittance Information screen (shown in Table XVIII) to force entry of any interest charges and insurance premiums due. These amounts can be entered by pressing the apostrophe (') to copy the present balance or by direct numerical data entry.

TABLE XVII

ENTER REMITTANCE INFORMATION

Dealer Number: 01010    Dealer Name: RED'S STEREO & APPLIANCES

| Unit ID | Model Nr | Serial No | Old Stat | New Stat | Pres Bal | Past Due | Amt Collec |
|---|---|---|---|---|---|---|---|
| 043680-8 | D9H | NSN | | SAU | 247.90 | | |
| 029984-2 | KSA51J | NSN | RTD | RTD | 44.98 | 44.98 | |
| 043680-8 | D9H | NSN | | SAU | 247.90 | | |
| 029984-2 | KSA51J | NSN | RTD | RTD | 44.98 | 44.98 | |
| 029984-2 | KSA51J | NSN | RTD | RTD | 44.98 | 44.98 | |
| 030226-7 | 664B | 0261 | | | 929.00 | 929.00 | |
| 030226-7 | 664B | 0261 | | | 929.00 | 929.00 | |
| 030226-7 | 664B | 0261 | | | 929.00 | 929.00 | |
| 026434-0 | CS-181 | 2247 | | | 669.00 | 669.00 | |
| 026434-0 | CS-181 | 2247 | | | 669.00 | 669.00 | |
| 026434-0 | CS-181 | 2247 | | | 669.00 | 669.00 | |

| ESC: Chgs | F1: Help | F2: SAU | ;: Past Due | ': Pres Bal | | | |
|---|---|---|---|---|---|---|---|
| F3: Find | F4: Percent | F5: Curt | F6: Total | F7: Clear | F8: Seq | F9: Det | |

The Enter Remittance Information screen includes the item's unit ID, the model number, the serial number, old status, new status, present balance, amount past due and amount to be collected. The screen has two cursors to aid in entering the amounts to be collected. The first cursor, a pair of arrows, points to the item's serial number, while the second cursor, a blinking underscore, appears in the amount collected field. Both cursors move up and down when the cursor control keys are pressed. In order to record an amount to be collected

TABLE XVIII

ENTER REMITTANCE INFORMATION

Dealer Number: 01010    Dealer Name: RED'S STEREO & APPLIANCES

| | Amt. Due | Amt Collected |
|---|---|---|
| Charges Not Itemized | | |
| 0–30 Days: | 300.97 | |
| Over 30 Days: | 0.00 | |
| Total Charges: | 300.97 | [    ] |
| Insurance Premium: | 0.00 | [    ] |

ESC: Exit    F1: Help    F7: Clear    ': Amt Due    F10: Save & Exit

When an audit is performed on a charge basis, a bill must be prepared to assess the client for the cost of the audit. The system of the present invention can automatically prepare such a bill with certain inputs (See FIG. 3J). The preparation of a bill begins with the selection of Option 11 from the Main Menu which displays the Time and Allocation Sheet—Select Dealers screen (shown in Table XIX). An 'X' is placed next to each dealer and client participating in the audit. By way of example, on the Time and Allocation Sheet—Select Dealers Screen, shown in Table XIX, a single motorcycle dealer has three products which are being audited. Each product is listed under a separate dealer number (i.e., Joe's Cycle Shop No. 11034, Harley of Chicago No. 33260 and Joe's Cycle Shop No. 20321) and office name (client). As such, each office (client) is charged for a portion of the entire audit). When multiple clients are selected, each will be printed on the final Time and Allocation Sheet and the cost of the audit will be automatically allocated by the system to the clients, according to the number of items audited. If only one client is selected, the entire cost of the audit is automatically charged to that one client.

TABLE XIX

| TIME AND ALLOCATION SHEET-SELECT DEALERS | | | | |
| --- | --- | --- | --- | --- |
| Dealer Name | Dealer Number | Office Name | Date Checked | Nr Items |
| X JOE'S CYCLE SHOP | 11034 | SUZUKI-CHI | 07/23/88 | 68 |
| _ THE JONES BOYS | 32380 | ITT ST. LOUIS | | 44 |
| X HARLEY OF CHICAGO | 33260 | ITT HD-DIV | 07/23/88 | 50 |
| X JOE'S CYCLE SHOP | 20321 | YAMAHA-CHI | 07/23/88 | 19 |
| _ 4-R.K.L., INC. | 11128 | ITT ATLANTA | | 57 |
| _ BUSINESS COMPUTERS, | 27012 | IBMCC/CHICAGO | | 2 |
| ESC: Exit     F1: Help | F7: PG 1 | F8: PG 2 | F10: Continue | |

After selection of the appropriate client(s), a function key (F10) is pressed to display the Time and Allocation Sheet—Enter Date & Time screen (shown in Table XX). This screen provides a plurality of input fields which allow the auditor to specify the time spent on a given audit. (Since more than one auditor can work on an audit, an input field is provided for the auditor's number (FSR No.)). Up to 20 different time periods and/or auditors can be entered for a single audit. After all the times are input, a function key (F10) is pressed to print the Time and Allocation Sheet (shown in Table XXI). This "bill" can then be sent directly to the client or to the home office for recordation and mailing.

TABLE XX

| TIME AND ALLOCATION SHEET-ENTER DATE & TIME | | | | | | | | | |
| --- | --- | --- | --- | --- | --- | --- | --- | --- | --- |
| FSR No. | Date | Arr Time | Non-Bus Time | Dep Time | FSR No. | Date | Arr Time | Non-Bus Time | Dep Time |
| [100] | [100289] | [0930] | [ ] | [1430] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| [ ] | [ ] | [ ] | [ ] | [ ] | [ ] | [ ] | [ ] | [ ] | [ ] |
| ESC: Return | | F1: Help | | | F10: Print Sheet | | | | |

TABLE XXI

| TIME AND ALLOCATION SHEET |
| --- |

Receiving Branch: 01-13-6007                                             FSR Name: Jack Snodgrass
Dealer:   BIG DEALER
          4001 EURY LANE, SUTIE 6
          SOMERSET, KY    42501

TIME REQUIRED FOR INSPECTION

| FSR | Date | Arr Time | Non-Bus Time | Dep Time | Total Time | FSR | Date | Arr Time | Non-Bus Time | Dep Time | Total Time |
| --- | --- | --- | --- | --- | --- | --- | --- | --- | --- | --- | --- |
| 100 | 10/02/89 | 09:30 | 00:00 | 14:30 | 05:00 | | | | | | |

Total Elapsed time:   5 Hrs   0 Min

ASSIGNING BRANCH COST DATA

| ←Assigning Branch→ | | | | | | |
| Name | Number | Dealer Name | Dlr No. | Nr Items | % Of Total | Amount Owed |
| --- | --- | --- | --- | --- | --- | --- |
| ITT CINCINNAT | 01-35-6014 | RED'S STEREO & APPLI | 01010 | 252 | 75.00 | 124.50 |
| ITT CINCINNAT | 01-35-6014 | SOUND WAVE | 57450 | 84 | ⁻25.00 | 41.50 |
| | | | Total: | 336 | 100.00 | 166.00 |

FSR Signature

Figure 3I:
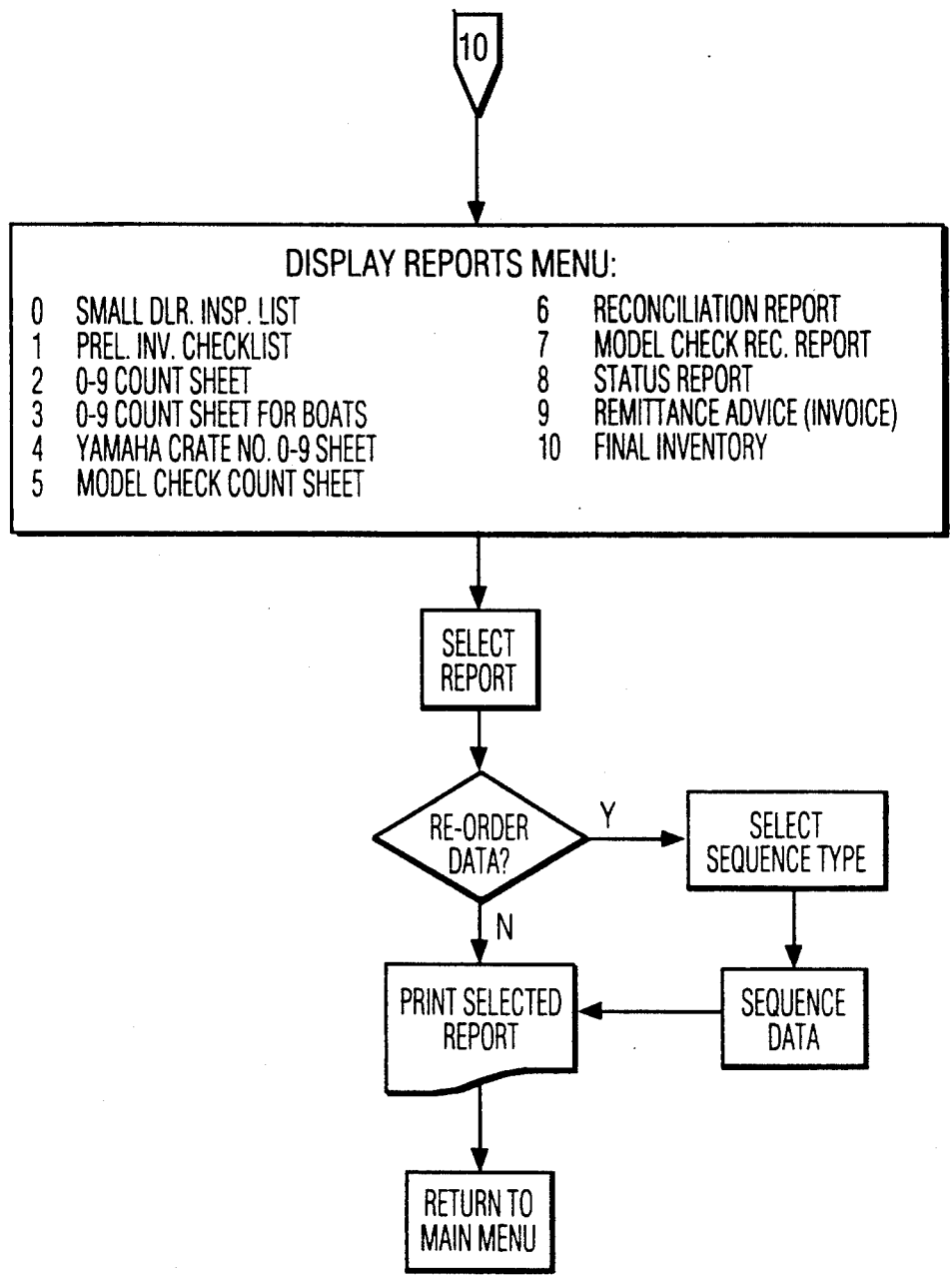
Figure 3J:
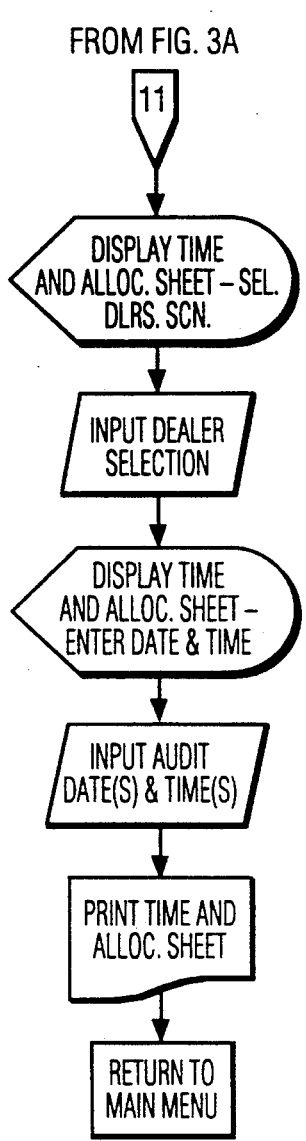
Figure 3L:
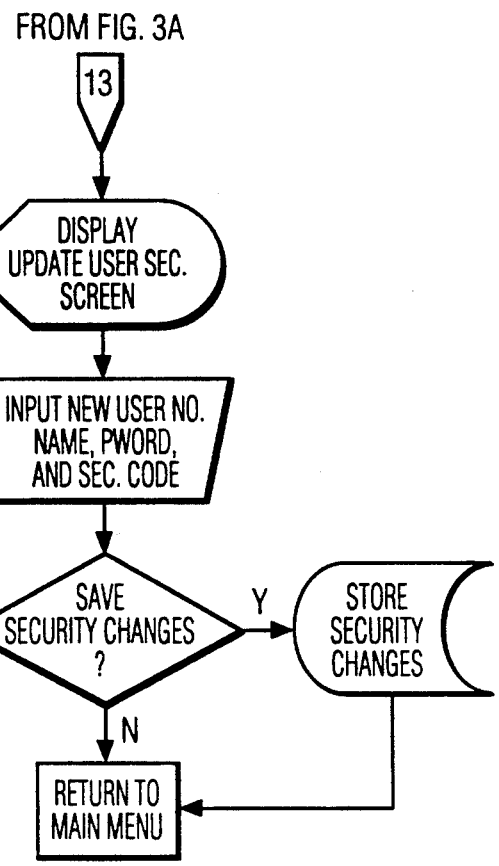

A series of reports can be produced by the system of the present invention (See FIG. 3I). When Option 10 is selected from the Main Menu, a Reports Menu screen is displayed (shown in Table XXII).

TABLE XXII
REPORTS MENU

| | |
|---|---|
| 0 Small Dealer Insp. Checklist | 6 Reconciliation Report |
| 1 Preliminary Inv. Checklist | 7 Model Check Reconciliation Rpt |
| 2 0-9 Count Sheet | 8 Status Report |
| 3 0-9 Count Sheet For Boats | 9 Remittance Advice |
| 4 Yamaha Crate No. 0-9 Sheet | 10 Final Inventory |
| 5 Model Check Count Sheet | |

| ESC: Exit | F1: Help | F2: Start/Stop | F4: Nr Copies | F8: Sort Sequence |
|---|---|---|---|---|

Enter Desired Option →

Reports are selected for printing by entering the report number next to the report and pressing 'Enter.' If desired, the sequence of the report can be modified before printing by pressing a function key (F8) and selecting a sequence from the displayed window (as shown in Table XII above). The number of copies to be printed can be selected by pressing another function key (F4). The number of copies always resets and defaults to one.

Prior to printing any report, the system will request verification that the printer is on and properly loaded with paper. A response of 'Y' begins the printing process while a response of 'N' returns the display to the Reports Menu screen. Any print job can be stopped by pressing the 'ESC' key. Thereafter, pressing 'Y' will stop the report while pressing 'N' will continue the report.

If only a portion of a report is to be printed, pressing a designated function key (F2) provides a window in which particular pages can be selected for printing. This function is primarily employed to restart printing if the printer jams or if a page is unreadable.

When an auditor chooses not to enter status codes directly into the PC as he conducts the audit, he must work from a document onto which he can record his results. A variety of such documents are available for printing by the system including: a Small Dealer Inspection Checklist, a Preliminary Inventory Checklist, a 0-9 Count Sheet, a 0-9 Count Sheet for Boats, a Yamaha Crate No. 0-9 Sheet and a Model Check Count Sheet.

As shown in FIG. 4, the Small Dealer Inspection Checklist provides a columnar list of all items for a dealer and is used when a dealer is too small to effectively use all regular system reports.

As shown in FIG. 5, the Preliminary Inventory Checklist is a general use inventory checklist. This list shows each item in detail and may include the total number of items, the total present balance and the total past due amounts for each manufacturer (when sequenced appropriately).

As shown in FIG. 6, the 0-9 Inventory Count Sheet is designed to facilitate medium to large inventories by arranging serial numbers in columns. This form places each item in column according to the last character in the serial number. Within columns, serial numbers are sorted by the last six positions. Only the last four positions are printed unless the number is identical to the previous number; then six positions are printed. The model number is also printed as a reference to assist in item verification. The 0-9 Count Sheet for Boats is identical to the normal 0-9 Inventory Count Sheet except that the last four characters of the serial number are ignored. This is because most boat manufacturers code a date in these last four positions. The Yamaha Crate No. 0-9 Sheet is identical to the normal 0-9 Inventory Count Sheet except that crate numbers are substituted for model numbers.

As shown in FIG. 7, the Model Check Count Sheet is used to facilitate audits when model numbers rather than serial numbers are counted. The total items and present balance by manufacture and model number are printed with columns for recording the items counted.

In order to assist the auditor and the dealer in the reconciliation process, a model check and a serial number check Reconciliation Report are available. A Reconciliation Report is selected by choosing Option 6 from the Reports menu. This report is essentially a hard copy of the Display Items Not Found screen shown in Table XIV.

When the auditors results are manually input into the finance company's mainframe, a Status Report is printed out. This report lists all items that have had a change in status as well as totals for all items printed. This information is thus readily available in readable form and does not have to be gleaned from the auditor's handwritten notes.

As shown in FIG. 8, a Remittance Advice (invoice) is a printed list of all items for which the auditor is collecting money. One copy of this report is given to the dealer as a receipt and another copy is sent to the finance company as a back-up or for manual input into the mainframe.

As shown in FIGS. 9A and 9B, the Final Inventory Checklist provides the dealer and the finance company with a record of the inventory at the end of the audit. A detail line is printed for each item listing, inter alia, new status, amount collected and other information downloaded from the mainframe. A Dealer Totals page, shown in FIG. 9B, prints along with the Final Inventory Checklist. This page includes the total amount collected, the totals by status code (for the newly entered status codes) and the remaining total amount unpaid.

Figure 3K:
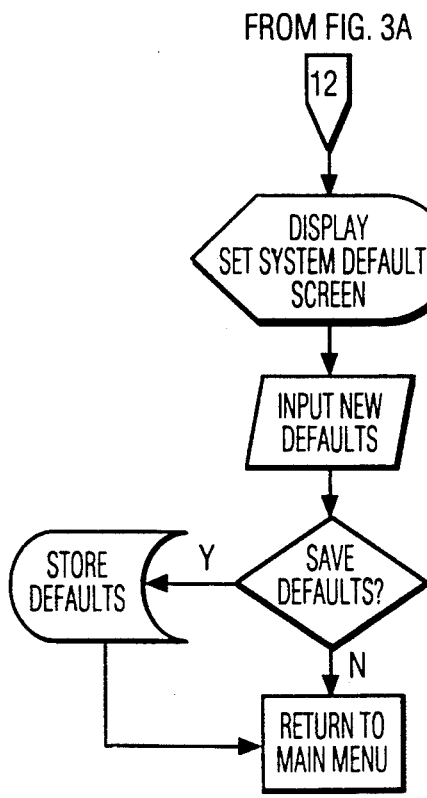

The software associated with each PC 112 is configured with a set of default values to be used in certain situations (See FIG. 3K). These values are preset, but can be changed. Selecting Option 12 from the Main Menu brings the Set Systems Default screen (shown in to Table XXIII) to the PC's display. This screen shows all user changeable current default values and provides the opportunity to alter them. It should be understood, that while each of these defaults is overrideable during normal use, the designated override is not maintained when the PC's power is cut off.

TABLE XXIII

| PAD ID: R251 | |
|---|---|
| SET SYSTEM DEFAULTS | |
| Branch Number: [01056001] | *Used when downloading data |
| Sort Sequence: [3] | *1 = Mfg, Model, Note Date (Descending) |
| | *2 = Note Date, Invoice, Item |
| | *3 = Serial Number (last 6 positions) |
| | *4 = Mfg, Model, Serial |
| | *5 = Mfg, Model, Serial (Last 6 pos.) |
| | *6 = Mfg, 0-9 Serial No. |

TABLE XXIII-continued

| | | |
|---|---|---|
| Dialing Prefix: | [T9,,      ] | *Refer to manual or F1 for help |
| Fin Stmt Age: | [365] | *Maximum age of a fin statement in days |
| Phone Number: | [1-800-950-3278] | *To the HO computer for downloading |
| ESC: Exit | | F1: Help    F10: Save |

Figure 3M:
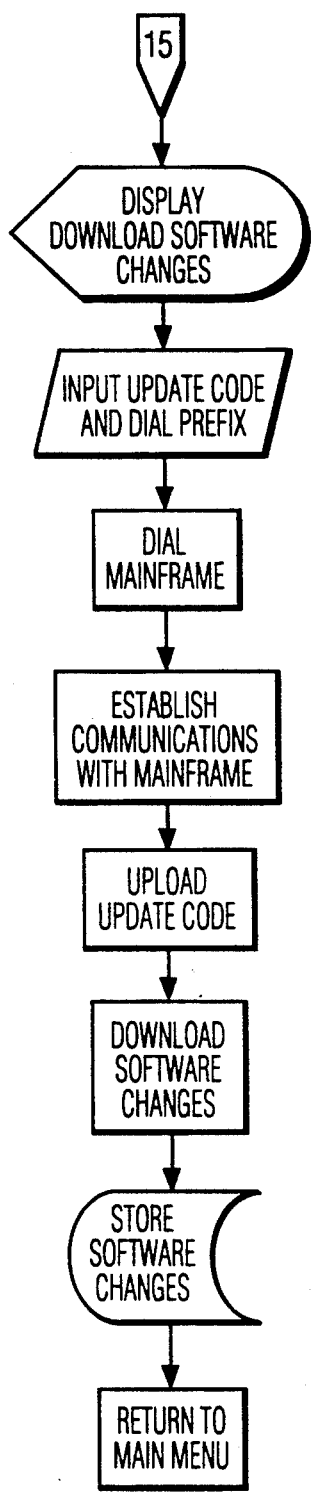

Programs comprising a portion of the system of the present invention are maintained on a disk as a series of files. As such, it is possible to update the programs by downloading changes from the finance company's mainframe 108 (See FIG. 3M). Selection Option 15 from the Main Menu displays a Download Software Changes screen (shown in Table XXIV). A software update code and a dialing prefix are entered. When the system is appropriately connected to a telephone outlet (as in the download dealer data function), a function key (F10) is pressed and the request is sent to the mainframe 108. The mainframe 108 responds by sending updated program files and comments describing the changes. The system of the present invention automatically replaces old files with new, updated files. There is no manual intervention required. All comments which have been downloaded are visible by pressing a function key (F2). If no comments are available a message will so indicate.

TABLE XXIV
DOWNLOAD SOFTWARE CHANGES

| | | | | |
|---|---|---|---|---|
| | Software update code: | [FAST31 ] | | |
| | Dialing prefix: | [T9,, | ] | |
| ESC: Exit | F1: Help    F2: View | F4: Cellular | | F10: Transmit |

While many offices manually input the auditor's reports into a minicomputer which uploads to the finance company's mainframe 108, the system of the present invention will allow the user to upload status codes and records of the amounts collected to the mainframe directly from the auditor's PC. As with the dealer data download, the system will automatically place the information in mainframe format. When appropriate, the upload information is automatically transferred to the mainframe during the next communications sessions. This is normally when the next day's work is being downloaded from the mainframe to the auditor's PC.

Ultimately, the system of the present invention is capable of producing a variety of reports listing the condition of items along with freeform comments. This provides automated, easy to read reports with more detail than is provided by status codes alone.

Figure 10A:
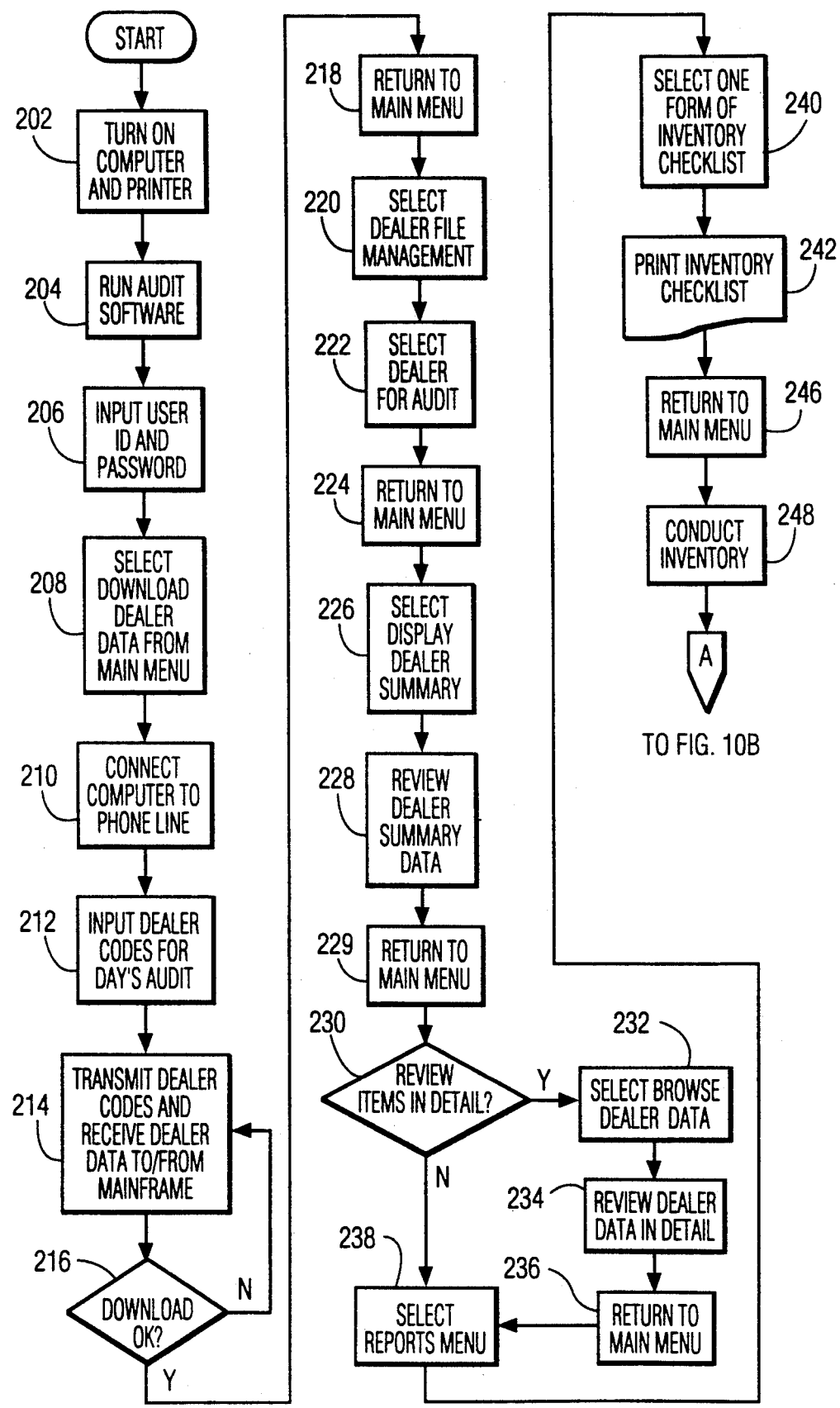
Figure 10C:
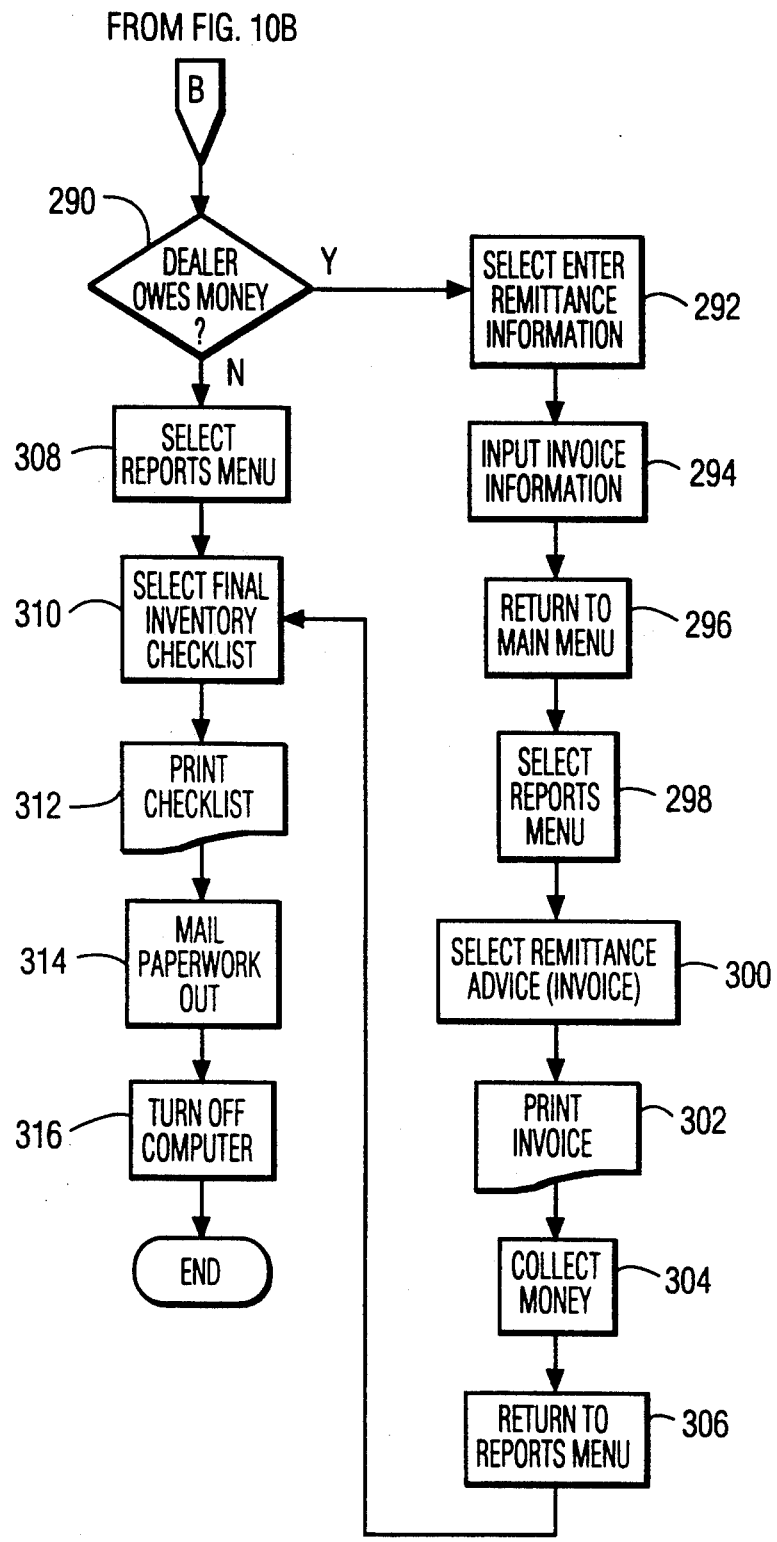

A typical workflow of an auditor using a preferred embodiment of the system and method of the present invention is illustrated in FIGS. 10A-10C. The auditor begins by turning on the portable computer and printer 202 and running the audit software 204. Immediately a screen is displayed which prompts the auditor to input his User ID and password 206. When the Main Menu is displayed the Download Dealer Data option is selected 208 to obtain information from the finance company's mainframe regarding the present inventory status of each dealer to be audited on that day. The auditor connects the PC (actually the modem) to a phone line 210 and inputs the dealer's codes 212. When the "Transmit" command is invoked (F10) from the Download Dealer Data screen the dealer codes are transmitted to the mainframe and the dealer inventory information is returned 214. The proper receipt of the information is then verified 216.

When the download is complete, the Main Menu is again displayed 218 and the Dealer File Management option is selected 220. A Dealer File Management screen is displayed from which a dealer is selected 222.

After a dealer is selected the auditor returns to the Main Menu 224. The Display Dealer Summary option is selected 226 which displays a Dealer Summary Display screen. The dealer summary data is reviewed 228 to give the auditor an idea of the scope of the audit. If it is desired to see some of the inventory items in further detail 230, the Browse Dealer Data option is selected 232 from the Main Menu and the items are reviewed 234.

Assuming that the auditor chooses to work from a printed checklist rather than carrying the PC, the Reports Menu option is selected from the Main Menu. One form of inventory checklist is selected 240 from the Reports Menu and then printed 242. The auditor then returns the display to the Main Menu 246 and leaves to conduct the inventory 248.

Upon completion of the inventory the auditor selects the Enter Inventory Results option 250 from the Main Menu and inputs the new status codes 252. In order to facilitate reconciliation with the dealer, the Display Items Not Found option is selected 256 from the Main Menu. These items are reviewed on the display 258 and the display can then be used to reconcile with the dealer 260 270. Alternatively, if the auditor and dealer prefer, a hard copy of the Items Not Found screen can be printed as a Reconciliation Report 260-268. The reconciliation is then undertaken from the printed sheet 270. If any items are found 272 during the reconciliation, their new status codes are input 274.

If the new status of each item must be input manually in a finance company office 278, a Status Report is printed 280-286.

In the last phase of an audit, the dealer must pay the auditor if he owes any money 290. In such cases, the amounts to be paid are entered 292-294 and an invoice with those amounts is printed 296-300. The auditor collects money from the dealer 304 and then prints a Final Inventory Checklist 310-312 for verification of the actual inventory.

When the audit is complete, the auditor mails out copies of each printed report to the main office 314. The computer is then shut off 316 and the auditor moves on to his next inventory location.

While reference has been made to specific hardware, software and functional elements, these are meant as illustrative only and one of skill in the art may alter such elements without departing from the spirit and intent of the present invention.

What is claimed is:

1. A system for monitoring and verifying inventory comprising:

first processing means, including data storage means into which data is written and from which data is read, said data storage means capable of storing information regarding at least one dealer's inventory; input means linked to said first processing means for communicating with said first processing means and operable by an operator; display means for displaying information that is entered and retrieved;

second processing means, including data storage means into which data is written and from which data is read, said data storage means storing information regarding a plurality of dealer's inventory;

first communication means for transmitting information from said first processing means to said second processing means and for receiving information from said second processing means; second communication means for transmitting information from said second processing means to said first processing means and for receiving information from said first processing means;

instructional means operable with said first processing means to generate a dealer identification request in response to input from said input means, to format said dealer identification input into a form understandable to said second processing means, and to cause said first communication means to transmit said formatted dealer identification to said second processing means; dealer inventory reply means for locating and retrieving dealer inventory information stored on said data storage means of said second processing means, wherein said dealer inventory information corresponds to said dealer identification, and causing said second communication means to transmit said dealer inventory information corresponding to said dealer identification to said first processing means; dealer inventory receipt means, included in said instructional means, for verifying that said inventory information was transmitted to said first processing means correctly and storing said dealer inventory information on said data storage means of said first processing means;

modification means associated with said instructional means and operable to cause a request to be transmitted to said second processing means by said first communication means thereby causing said second processing means to transmit modifications for said instructional means stored on said data storage means of said second processing means to said first processing means via said second communication means, and upon receipt by said first processing means of said modifications to verify correspondence to modifications as transmitted by said second processing means and to cause said instructional means to be modified in accordance with said modifications; and wherein said instructional means further comprises dealer list means for maintaining and selectively displaying on said display means a list of all dealer files stored on said storage means of said first processing means, dealer selection means for accepting a dealer selection selected from said display of all dealer files by said dealer list means, wherein said dealer selection is input through said input means, and for causing said dealer information, corresponding to said selected dealer and maintained on said storage means of said first processing means, to be accessed and maintained for later action, dealer summary information display means for selectively displaying on said display means, portions of said dealer information of said selected dealer, said portions of said dealer information caused to be displayed by said dealer summary information display means including, at a user's option, said selected dealer's financial position data, items for manufacturer in said selected dealer's inventory, said selected dealer's address data, comments about said selected dealer, total items and outstanding balance by new status code for said selected dealer, and total items and outstanding balance by original status for said selected dealer.

2. A system for monitoring and verifying inventory by exchanging data communicated over a communications links, comprising:

master processing means, including data storage means capable of storing and maintaining inventory data for a plurality of dealers;

slave processing means, including data storage means capable of storing inventory data for at least one dealer;

input means coupled to said slave processing means to permit an operator to communicate instruction and data to said slave processing means;

first communication means associated with said master processing means and a second communication means associated with said slave processing means, said first and second communication means being operable in combination to transfer information between said master and slave processing means via said communications link;

first instructional means operable with said master processing means to cause said master processing means to locate and retrieve specified inventory data from the data storage means associated therewith and to transmit said specified inventory data to said slave processing means via said communications link in response to a request for said specified inventory data transmitted from said slave processing means via said communications link;

second instructional means operable with said slave processing means to generate a request for said specified inventory data in response to input from said input means and to cause said request for said specified inventory data to be transmitted to said master processing means via said communications link, and, upon receipt of said specified inventory data from said master processing means, to cause said specified inventory data to be stored within the data storage means of said slave processing means; and modification means operable to automatically modify the operation of said second instructional means in response to a request for said modification transmitted via said communications link from said slave processing means;

wherein said second instructional means further comprises dealer list means for maintaining and selectively displaying a list of all dealer files stored on said storage means associated with said first processing means, dealer selection means whereby dealer information for a dealer selected from said dealer list, and maintained on said storage means associated with said first processing means, is accessed and maintained for later action, dealer summary information display means for selectively displaying portions of said dealer information of said selected dealer, said portions of said dealer information caused to be displayed by said dealer summary information display means including, at a user's option, said selected dealer's financial position data, items per manufacturer in said selected dealer's inventory, said selected dealer's address data, comments about said selected dealer, total items and outstanding balance by new status code for said selected dealer, and total items and outstanding balance by original status for said selected dealer.

3. A system for monitoring and verifying inventory by exchanging data communicated over a communications link, comprising:

master processing means, including data storage means capable of storing, and maintaining inventory data for a plurality of dealers;

slave processing means, including data storage means capable of storing inventory data for at least one dealer;

input means coupled to said slave processing means to permit an operator to communicate instruction and data to said slave processing means;

first communication means associated with said master processing means and a second communication means associated with said slave processing means, said first and second communications means being operable in combination to transfer information between said master and slave processing means via said communications link;

first instructional means operable with said master processing means to cause said master processing means to locate and retrieve specified inventory data from the data storage means associated therewith and to transmit said specified inventory data to said slave processing means via said communications link in response to a request for said specified inventory data transmitted from said slave processing means via said communications link;

second instructional means operable with said slave processing means to generate a request for said specified inventory data in response to input from said input means and to cause said request for said specified inventory data to be transmitted to said master processing means via said communications link, and, upon receipt of said specified inventory data from said master processing means, to cause said specified inventory data to be stored within the data storage means of said slave processing means;

modification means operable to automatically modify the operation of said second instructional means in response to a request for said modification transmitted via said communications link from said slave processing means; and wherein said second instructional means further comprises dealer list means for maintaining and selectively displaying a list of all dealer files stored on said storage means associated with said slave processing means, dealer selection means whereby inventory information for a dealer selected from said sealer list, and maintained on said storage means associated with said slave processing means, is accessed and maintained for later action, and dealer summary information display means for selectively displaying portions of said inventory information of said selected dealer; and wherein said portions of said inventory information caused to be displayed by said dealer summary information display means include, at a user's option, said selected dealer's financial position data, items per manufacturer in said selected dealer's inventory, said selected dealer's address data, comments about said selected dealer, total items and outstanding balance by new status code for said selected dealer, and total items and outstanding balance by original status for said selected dealer.

4. In a system for monitoring and verifying inventory comprising a master data processing and storage unit and at least one slave data processing and storage unit, said units being operative to exchange inventory data via a communications link, wherein said master unit operates in response to a first instruction means and said slave unit operates in response to a second instruction means and wherein said second instruction means may vary as between two or more of said slave units, the improvement therewith comprising:

a first instruction-change means located in said master unit operative when selected to cause predetermined changes to said second instruction means in a selected slave unit and means located in said master unit responsive to a request via said communications link from a slave unit to cause said predetermined changes to said second instruction means of said slave unit to be transmitted to and implemented by said slave unit; and wherein said second instructional means further comprises dealer list means for maintaining and selectively displaying a list of all inventory files stored in said slave unit sorted by dealer, dealer selection means whereby inventory information for a dealer selected from said dealer list, and stored in said slave unit, is accessed and maintained for later action, and dealer summary information display means for selectively displaying portions of said inventory information of said selected dealer; and wherein said portions of said inventory information caused to be displayed by said dealer summary information display means include, at a user's option, said selected dealer's financial position data, items per manufacturer in said selected dealer's inventory, said selected dealer's address data, comments about said selected dealer, total items and outstanding balance by new status code for said selected dealer, and total items and outstanding balance by original status for said selected dealer.

* * * * *